(12) United States Patent
MolavianJazi et al.

(10) Patent No.: US 12,096,464 B2
(45) Date of Patent: Sep. 17, 2024

(54) METHODS AND APPARATUS FOR INTERFERENCE REDUCTION AND COORDINATION

(71) Applicant: Samsung Electronics Co., Ltd., Suwon-si (KR)

(72) Inventors: Ebrahim MolavianJazi, Santa Clara, CA (US); Jeongho Jeon, San Jose, CA (US); Joonyoung Cho, Portland, OR (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 17/447,400

(22) Filed: Sep. 10, 2021

(65) Prior Publication Data

US 2022/0095309 A1   Mar. 24, 2022

Related U.S. Application Data

(60) Provisional application No. 63/081,124, filed on Sep. 21, 2020.

(51) Int. Cl.
*H04W 72/541* (2023.01)
*H04W 56/00* (2009.01)
(Continued)

(52) U.S. Cl.
CPC ....... *H04W 72/541* (2023.01); *H04W 56/001* (2013.01); *H04W 68/005* (2013.01); *H04W 72/0446* (2013.01); *H04W 72/56* (2023.01)

(58) Field of Classification Search
CPC ............. H04W 72/541; H04W 56/001; H04W 68/005; H04W 72/0446; H04W 72/56; H04W 16/10
See application file for complete search history.

(56) References Cited

U.S. PATENT DOCUMENTS

2003/0117964 A1\* 6/2003 Chen .................... H04W 72/543
370/468
2009/0268684 A1\* 10/2009 Lott ..................... H04W 72/543
370/329

(Continued)

FOREIGN PATENT DOCUMENTS

EP           2533595 A1 \* 12/2012  .......... H04W 28/048
KR   10-2012-0105918 A     9/2012
WO       2012077974 A2     6/2012

OTHER PUBLICATIONS

International Search Report and Written Opinion of the International Searching Authority dated Dec. 24, 2021, in connection with International Application No. PCT/KR2021/012830, 9 pages.

(Continued)

*Primary Examiner* — Rina C Pancholi

(57) ABSTRACT

Methods and apparatuses for interference reduction and coordination in a wireless communication system. A method for operating a base station includes determining first information for a first serving cell that includes a first interference level from a set of interference levels, a first priority level from a set of priority levels, and a first resource from a set of resources. The first interference level and the first priority level are associated with the first resource. The method further includes transmitting the first information.

20 Claims, 12 Drawing Sheets

(51) Int. Cl.
    *H04W 68/00*     (2009.01)
    *H04W 72/0446*     (2023.01)
    *H04W 72/56*     (2023.01)

(56) References Cited

U.S. PATENT DOCUMENTS

| | | | | |
|---|---|---|---|---|
| 2010/0246503 | A1* | 9/2010 | Fox | H04W 52/247 |
| | | | | 455/452.2 |
| 2014/0321374 | A1* | 10/2014 | Kim | H04L 5/0073 |
| | | | | 370/329 |
| 2015/0009944 | A1* | 1/2015 | Li | H04W 72/23 |
| | | | | 370/329 |
| 2018/0167848 | A1* | 6/2018 | Lei | H04W 72/0453 |
| 2018/0270835 | A1* | 9/2018 | Chen | H04W 72/0446 |
| 2019/0053246 | A1* | 2/2019 | Olfat | H04L 27/0006 |
| 2019/0364449 | A1* | 11/2019 | Yang | H04W 72/04 |
| 2020/0396621 | A1* | 12/2020 | Park | H04J 11/0056 |
| 2022/0263615 | A1* | 8/2022 | Viering | H04L 5/0073 |

OTHER PUBLICATIONS

"5G; NR; Physical channels and modulation (3GPP TS 38.211 version 16.2.0 Release 16)", ETSI TS 138 211 V16.2.0, Jul. 2020, 136 pages.

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

"5G; NR; NR and NG-RAN Overall description; Stage-2 (3GPP TS 38.300 version 16.2.0 Release 16)", ETSI TS 138 300 V16.2.0, Jul. 2020, 150 pages.

"LTE; Evolved Universal Terrestrial Radio Access (E-UTRA) and Evolved Universal Terrestrial Radio Access Network (E-UTRAN); Overall description; Stage 2 (3GPP TS 36.300 version 16.2.0 Release 16)", ETSI TS 136 300 V16.2.0, Jul. 2020, 401 pages.

"LTE; Evolved Universal Terrestrial Radio Access Network (E-UTRAN); X2 Application Protocol (X2AP) (3GPP TS 36.423 version 16.2.0 Release 16)", ETSI TS 136 423 V16.2.0, Jul. 2020, 491 pages.

"5G; NG-RAN; XN Application Protocol (XnAP) (3GPP TS 38.423 version 16.2.0 Release 16)", ETSI TS 138 423 V16.2.0, Jul. 2020, 446 pages.

* cited by examiner

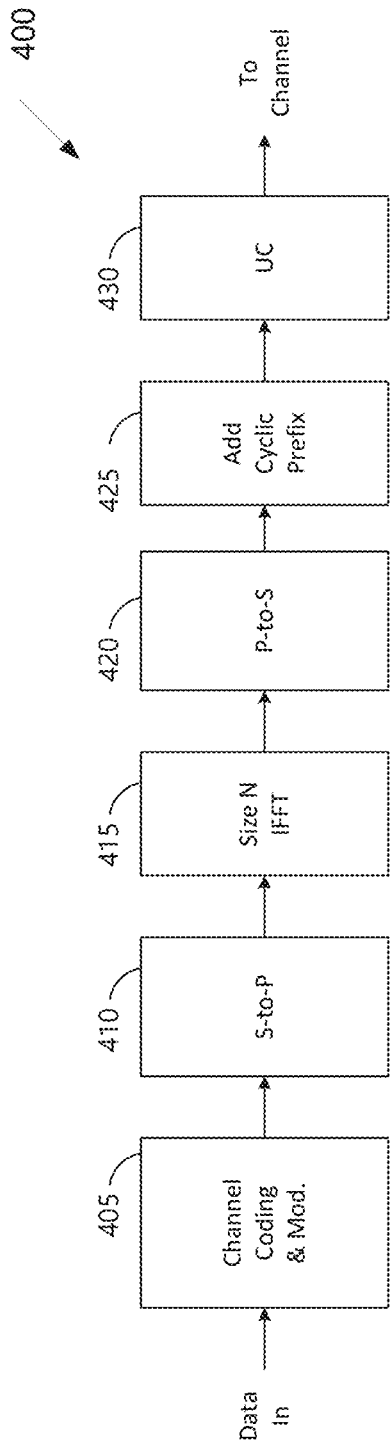
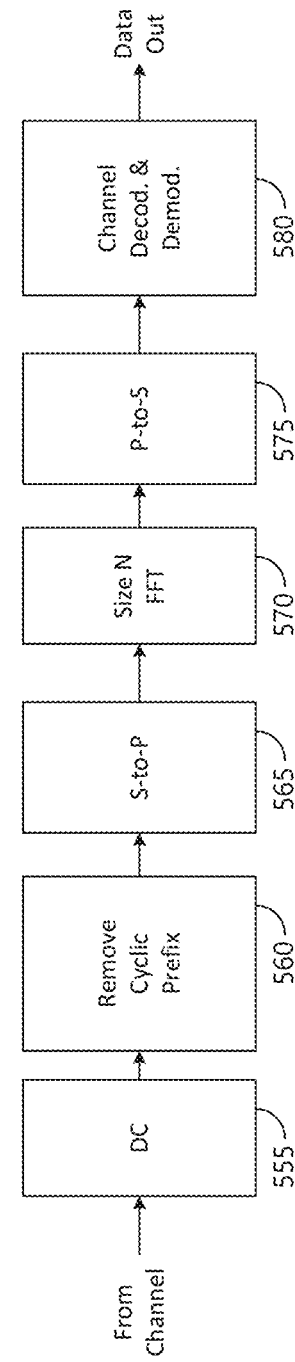
FIG. 4
FIG. 5

METHODS AND APPARATUS FOR INTERFERENCE REDUCTION AND COORDINATION

CROSS-REFERENCE TO RELATED APPLICATIONS AND CLAIM OF PRIORITY

The present application claims priority to U.S. Provisional Patent Application No. 63/081,124, filed on Sep. 21, 2020. The content of the above-identified patent document is incorporated herein by reference.

TECHNICAL FIELD

The present disclosure relates generally to wireless communication systems and, more specifically, the present disclosure relates to interference protection and coordination in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to interference protection and coordination in a wireless communication system.

In one embodiment, a method for operating a base station is provided. The method includes determining first information for a first serving cell that includes a first interference level from a set of interference levels, a first priority level from a set of priority levels, and a first resource from a set of resources. The first interference level and the first priority level are associated with the first resource. The method further includes transmitting the first information.

In another embodiment, a first base station is provided. The first base station includes a processor configured to determine first information for a first serving cell that includes a first interference level from a set of interference levels, a first priority level from a set of priority levels, and a first resource from a set of resources, wherein the first interference level and the first priority level are associated with the first resource. The first base station further includes a transceiver operably connected to the processor. The transceiver is configured to transmit the first information.

In yet another embodiment, a second base station is provided. The second base station includes a transceiver configured to receive first information for a first serving cell that includes a first interference level from a set of interference levels, a first priority level from a set of priority levels, and a first resource from a set of resources. The first interference level and the first priority level are associated with the first resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate example wireless transmit and receive paths according to this disclosure;

DETAILED DESCRIPTION

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.2.0, "NR; Physical channels and modulation"; 3GPP TS 38.212 v16.2.0, "NR; Multiplexing and Channel coding"; 3GPP TS 38.213 v16.2.0, "NR; Physical Layer Procedures for Control"; 3GPP TS 38.214 v16.2.0, "NR; Physical Layer Procedures for Data"; 3GPP TS 38.321 v16.1.0, "NR; Medium Access Control (MAC) protocol specification"; 3GPP TS 38.331 v16.1.0, "NR; Radio Resource Control (RRC) Protocol Specification"; 3GPP TS 38.300 v16.2.0, "NR; NR and NG-RAN Overall Description; Stage 2"; 3GPP TS 36.300 v16.2.0, "Evolved Universal Terrestrial Radio Access (E-UTRA) and Evolved Universal Terrestrial Radio Access Network (E-UTRAN); Overall description; Stage 2"; 3GPP TS 36.423 v16.2.0, "Evolved Universal Terrestrial Radio Access Network (E-UTRAN); X2 application protocol (X2AP)"; and 3GPP TS 38.423 Rel-16 v16.2.0, "NG-RAN; Xn application protocol (XnAP)."

Figure 1:
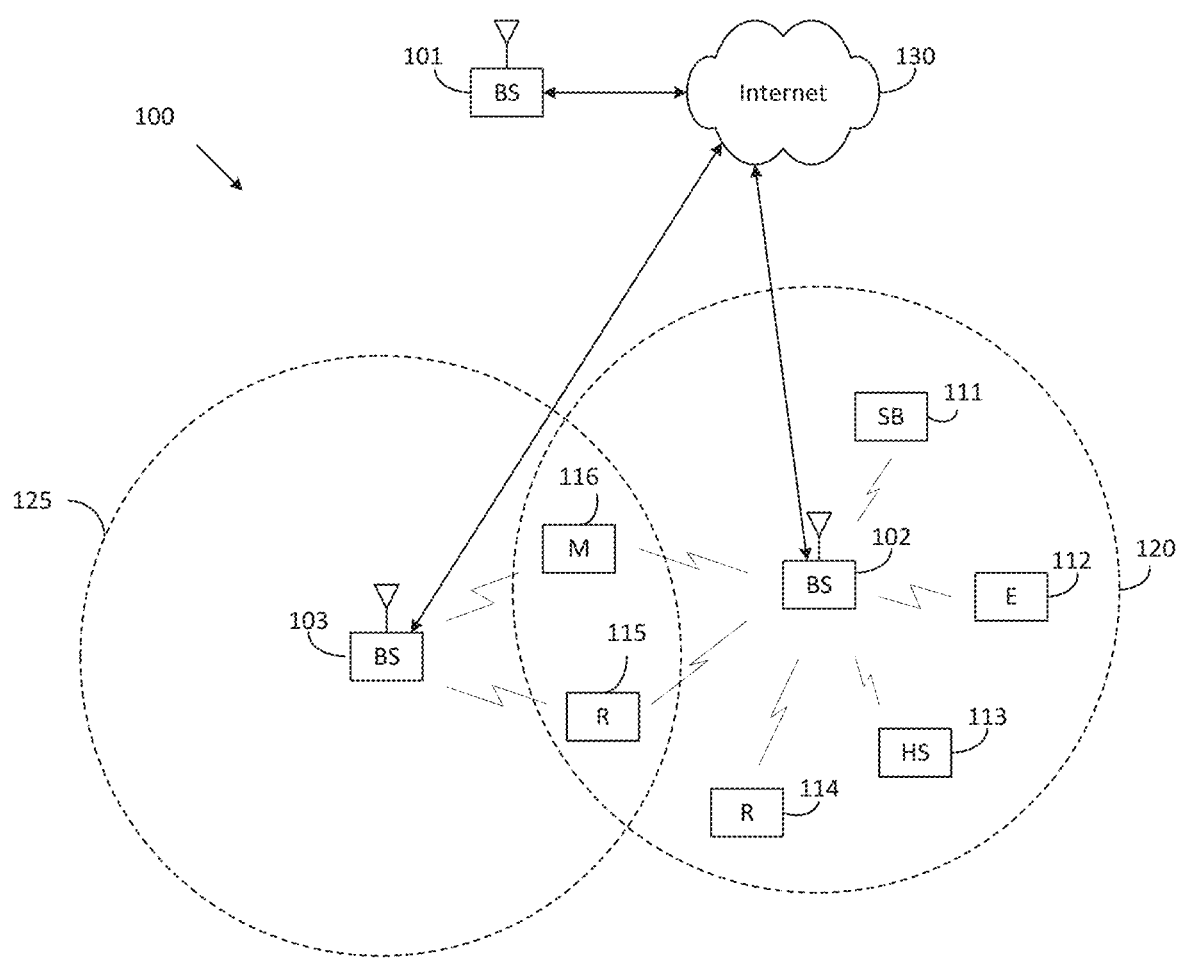
FIG. 1 illustrates an example wireless network according to embodiments of the present disclosure.
Figure 2:
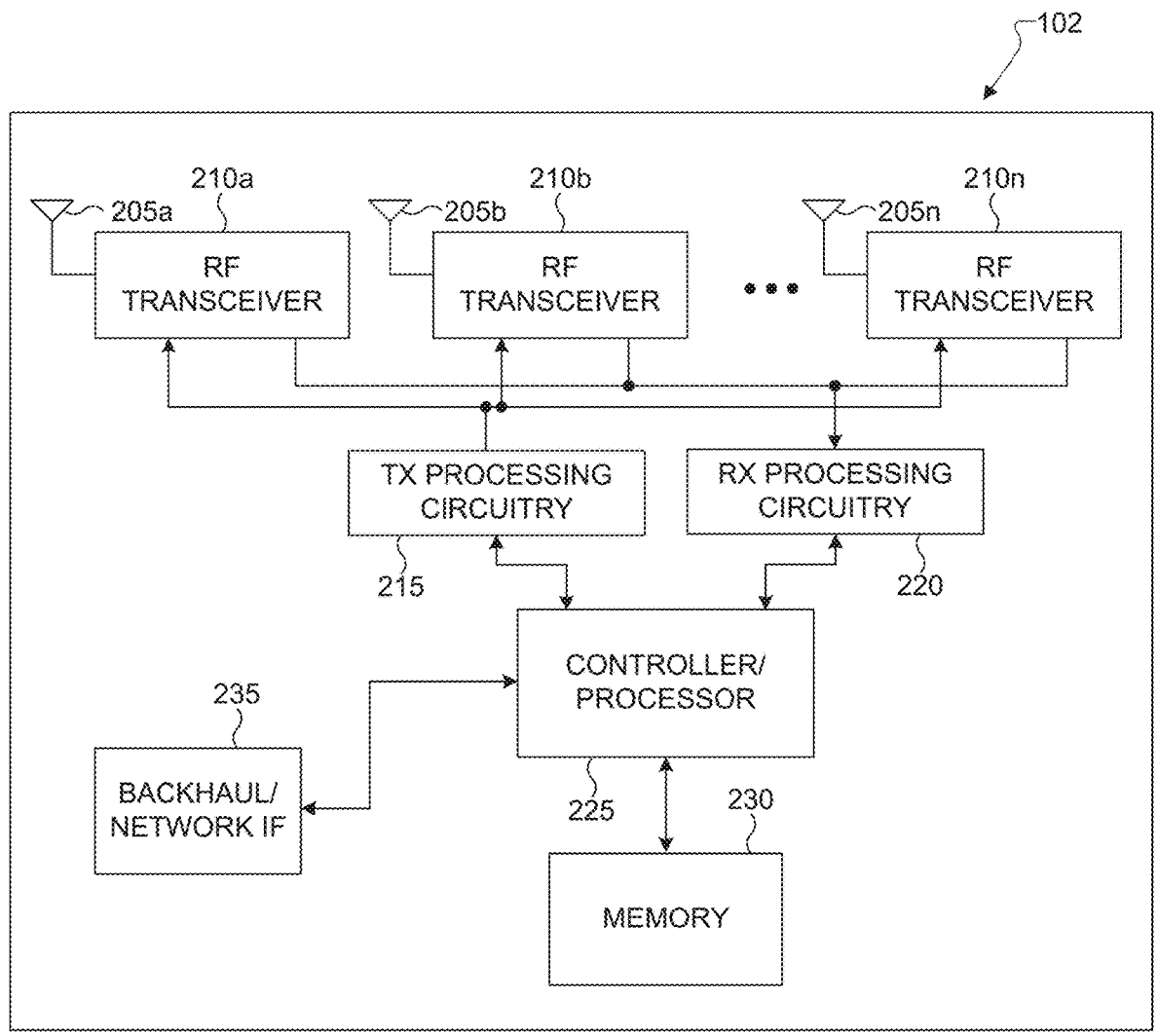
FIG. 2 illustrates an example gNB according to embodiments of the present disclosure.
Figure 3:
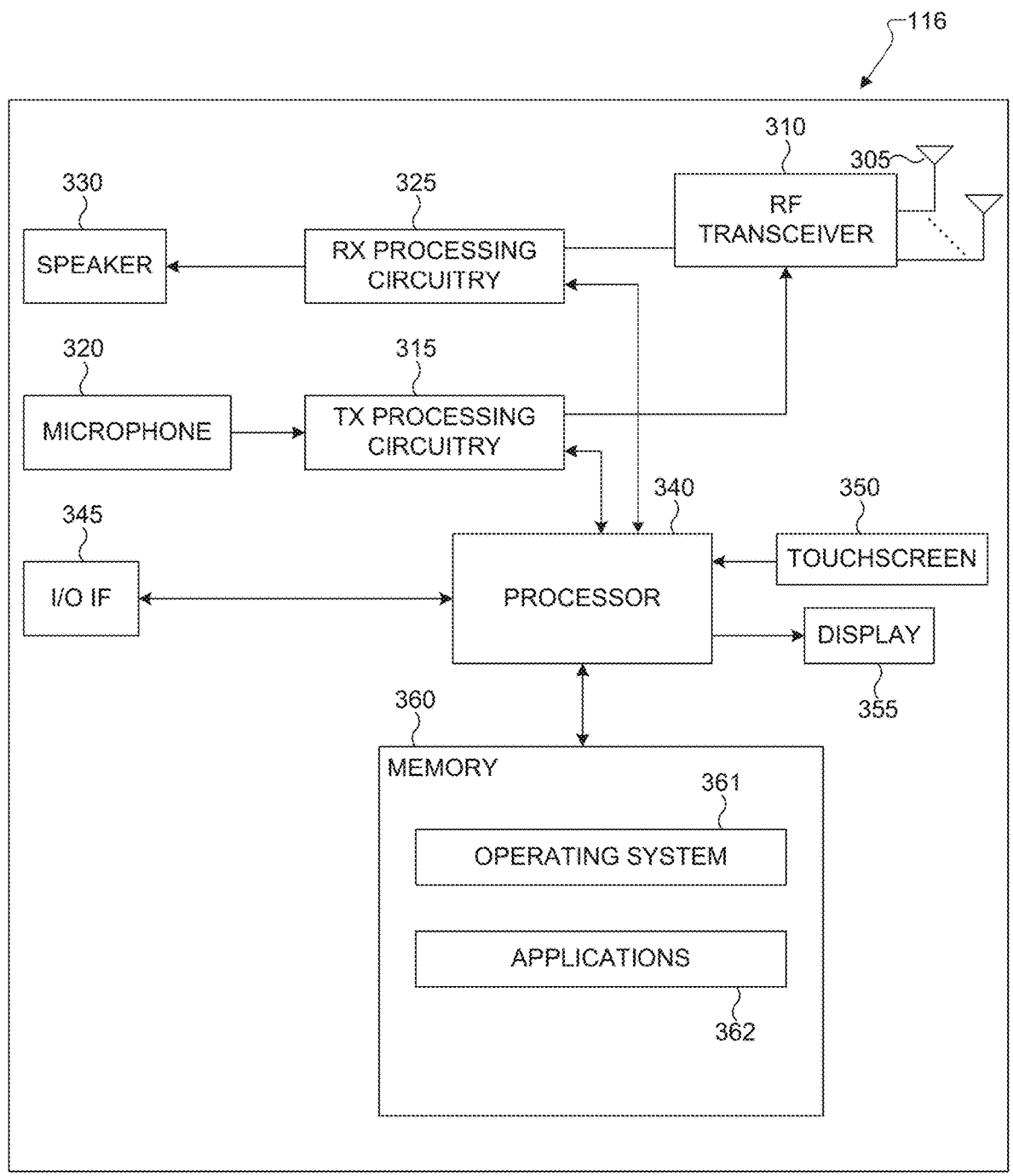
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc.

For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for interference reduction and coordination. In certain embodiments, and one or more of the gNBs 101-103 includes circuitry, programming, or a combination thereof, for interference reduction and coordination.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support interference reduction and coordination. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals and the transmission of uplink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure relates to a pre-5G or 5G or beyond 5G communication system to be provided for supporting one or more of: higher data rates, lower latency, higher reliability, and massive connectivity, beyond 4G communication system such as LTE. Although the focus of this disclosure is on 3GPP 5G NR communication systems, various embodiments may apply in general to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

The present disclosure pertains inter-cell interference coordination, where two or multiple (neighbour) cells operate in a same frequency band, and therefore the transmission and/or receptions in those cells, at least for cell-edge UEs, are significantly impacted by inter-cell interference.

Although the focus of the present disclosure is on inter-cell interference, e.g., for UEs at the edge of two or multiple cells, "interference" can be considered to apply to other spatial units/entities, such as TRPs, TPs, beams and so on, e.g., for UEs at the edge of two or multiple TRPs/TPs/beams and so on, such that inter-TRP/inter-TP/inter-beam interference and so on, can be considered as well.

There is a need to protect time/frequency/spatial resources from inter-cell interference. There is another need for interference-aware scheduling. There is yet another need for adjusted gNB/UE behaviour to accommodate resource protection by, e.g., reducing transmission power. There is a further need that timing of gNB/UE transmissions and receptions are aligned with the timing of protected resources.

The present disclosure provides enhancements for inter-cell interference protection. Various embodiments present methods for indication of protected resources, such as time/frequency/spatial resources with multiple interference protection levels, wherein an interference protection level corresponds to a certain level or range for transmission activity, transmission likelihood, transmission power level, and so on. Various embodiments provide solutions for indication of priority levels for resources, so that more important/critical resources are protected with a higher protection level against inter-cell interference.

In the present disclosure, various embodiments present solutions for an indication of certain interfering transmissions and the corresponding assistance information such as configuration information of those interfering transmissions. In the present disclosure, various embodiments provide methods for configuration of time patterns that facilitate CSI-RS transmissions or configured grant PUSCH (CG-PUSCH) transmissions with variable power level, beam management and beam failure recovery and transmission timing constraints aligned with timing of interference-protected resources.

One motivation for focusing on these enhanced schemes is low-band operation, wherein a boundary of serving cell is large, and therefore, many UEs can be impacted by inter-cell interference. The embodiments, however, are generic and can apply to other frequency bands including various frequency bands in different frequency ranges (FR) such as FR1, FR2, and FR4 or FR2-2, e.g., mid frequency bands, such as 1-7 GHz, and high/millimetre frequency bands, such as 24-100 GHz. In addition, the embodiments are generic and can apply to various use cases and settings as well, such as enhanced mobile broadband (eMBB), ultra reliable low latency (URLLC) and industrial internet of things (IIoT), massive machine type communication (mMTC) and IoT, sidelink/vehicle-to-everything (V2X), operation in unlicensed/shared spectrum (NR-U), non-terrestrial networks (NTN), operation with reduced capability (RedCap) UEs, private or non-public networks (NPN), and so on.

The present disclosure addresses the above concepts and provides additional design aspects for supporting inter-cell interference protection and coordination and discloses novel solutions and embodiments for inter-gNB message exchange as well as UE operations to reduce inter-cell interference as summarized in the following and fully elaborated further below.

In one embodiment of E-1, a coordination between aggressor and victim gNBs about inter-cell interference protection levels is provided. In one embodiment, when two (neighbor) cells operate in a same frequency band/carrier, a first gNB such as an aggressor gNB, e.g., serving a macro-cell can indicate (for example over Xn interface) to a second gNB such as a victim gNB e.g., serving a small cell how much protection is provided for different time/frequency/spatial resources, in terms of how much inter-cell interference may be caused by the aggressor gNB and/or experienced by the victim gNB.

Accordingly, the first gNB minimizes or eliminates all inter-cell interference to a given time/frequency/spatial resource(s) by minimizing or totally avoiding all transmissions by the first gNB in the time/frequency/spatial resource(s), to facilitate scheduling opportunities for victim cell(s) such as cell-edge UEs of victim gNB(s). In that sense, those time/frequency/spatial resources can be referred to as "reduced activity allocation (RAA)" or "reduced activity resources (RAR)." On the other hand, the first gNB schedules and/or configures transmissions such as UL/DL/SL more freely and flexibly in time/frequency/spatial resources that are less or not protected.

An interference protection level, ranging progressively in interference protection from "no protection" to "medium protection" to "full protection," can depend upon a transmission activity level, e.g., a transmission presence/likelihood/density, a transmission power level, a transmission duration, a transmission periodicity, a service/traffic type e.g., eMBB vs. URLLC associated with the transmission, or a UE density e.g., number of (active) UEs such as number of (active) UEs that share the resource and/or may receive/transmit using the resource, or latency/throughput requirements associated with the transmissions in the resource, and so on.

In one embodiment of E-1-1, a coordination between aggressor and victim gNBs about inter-cell interference occurrence levels along with priority levels is provided. In one embodiment, when two (neighbor) cells operate in a same frequency band, a second gNB such as a victim gNB can indicate to a first gNB such as an aggressor gNB about inter-cell interference levels experienced in time/frequency/spatial resources possibly along with a priority level to indicate how critical/important a resource is for the second gNB operation such as for scheduling critical services. According to this embodiment, such an indication can additionally include or implicitly indicate a preferred set of resources with a preferred interference protection level (as discussed in the aforementioned embodiment E-1) from the second gNB perspective and requested from the first gNB. It is noted that the first gNB namely the aggressor gNB may or may not take such preference and request into account, and any action is up to the first gNB.

In one embodiment of E-2, a coordination between aggressor and victim gNBs about inter-cell interference by providing assistance information of interfering transmissions is provided. In one embodiment, when two (neighbor) cells operate in a same frequency band, a second gNB such as a victim gNB can indicate (for example, over Xn interface) to a first gNB such as an aggressor gNB about inter-cell interference levels experienced in time/frequency/spatial resources possibly along with a priority level to indicate how critical/important a resource is for the second gNB operation such as for scheduling/configuring critical services.

According to this embodiment, such an indication can additionally include or implicitly indicate a preferred set of resources with a preferred interference protection level (as discussed in the aforementioned embodiment E-1) from the second/victim gNB perspective and requested from the first/aggressor gNB. It is noted that the first gNB namely the aggressor gNB may or may not take such preference and request into account, and any action is up to the first gNB. However, an indication of priority levels can help the first/aggressor cell or gNB to better realize the interference situation from the second/victim gNB perspective, and e.g., in case of partially accommodating the request from the second/victim gNB, to better decided which resources are more important/critical to be protected e.g., in terms of reducing transmission activity level (e.g., transmission likelihood/density/power level) on those resource.

In one embodiment of E-2-1, a coordination between aggressor and victim gNBs about inter-cell interference by indicating a preferred/requested configuration for "reduced activity/high protection" resources is provided. In one embodiment, when two (neighbor) cells operate in a same frequency band, a second gNB such as a victim gNB can indicate (for example, over Xn interface) to a first gNB such as an aggressor gNB about a preferred set of "reduced activity" or "high protection" time/frequency/spatial resources.

In one embodiment of E-3, CSI-RS with varying transmission power to handle inter-cell interference is provided. In one embodiment, for periodic and/or semi-persistent CSI-RS (P/SP CSI-RS), a UE can be configured with two/multiple different transmission power levels, or with a difference between the transmission power levels, along with two/multiple disjoint time patterns such as two/multiple disjoint sets of slots, so that the UE receives a same CSI-RS (resource) with a first transmission power level in a first time pattern/a first set of slots, and with a second transmission power level in a second time pattern/a second set of slots, wherein the first transmission power level is different from the second transmission power level. The UE can account for the difference on the CSI-RS transmission power levels when computing a CSI report when using one time pattern or when using multiple time patterns for CSI-RS measurements in order to determine the CSI report.

In one embodiment of E-3-1, a configuration of two/multiple sets of uplink power control parameters for CG-PUSCH is provided according to a configuration for reduced activity slots/protected resources. In one embodiment, a UE can be configured with two/multiple sets of uplink power control parameters for a CG-PUSCH configuration, each of which corresponds to a set of slots/occasions/resources for CG-PUSCH transmission. According to this embodiment, the UE transmits a CG-PUSCH with a first set of power control parameters in a first set of slots/resources, and with a second set of power control parameters in a second set of slots/resources.

In one embodiment of E-3-2, a configuration of a time pattern for L1-reference signal received power (RSRP)/L1-signal to interference noise ratio (SINR) measurements used for beam management and/or link recovery procedure is provided according to a configuration for reduced activity slots/protected resources. In one embodiment, a UE can be configured with a time pattern, such as a set of slots/occasions, for measurement of SSB and/or CSI-RS resource, such as L1/L3 RSRP or SINR measurement or variants thereof, aimed for beam management and/or link recovery procedure (also known as, beam failure recovery), e.g., including for radio link quality measurements (such as for beam failure detection and/or new candidate beam identification) on the bandwidth part (BWP) of the serving cell. According to this embodiment, the UE is not expected to use measurements of the SSB and/or CSI-RS resource (e.g., not allowed to average the measurements) when reporting L1/L3 RSRP or SINR measurements.

In one embodiment of E-4, transmission timing constraints according to a configuration for reduced activity slots/protected resources is provided. In one embodiment, a UE can be configured with a pattern for transmission timing constraints such as K0, K1, and K2 based on a configuration of reduced activity slots or more generally protected resources, so that UE transmission and/or reception timing, such as reception timing of a dynamically scheduled PDSCH and transmission timing of a hybrid automatic repeat request-acknowledgement (HARQ-ACK) information feedback as well as transmission timing of a dynamically scheduled PUSCH and so on, overlap with reduced activity slots/protected resources.

In the present disclosure, the terms "synchronization signal and physical broadcasting channel (PBCH) block (SSB)" and "SS/PBCH block" are used interchangeably.

In the present disclosure, the term "configuration" and variations thereof (such as "configured" and so on) are used to refer to one or more of: a system information signalling such as by a master information block (MIB) or a system information block (SIB), a common higher layer/RRC signalling, and a dedicated higher layer/RRC signalling.

An antenna port is defined such that the channel over which a symbol on the antenna port is conveyed can be inferred from the channel over which another symbol on the same antenna port is conveyed.

For DMRS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG.

For DMRS associated with a PDCCH, the channel over which a PDCCH symbol on one antenna port is conveyed can be inferred from the channel over which a DMRS symbol on the same antenna port is conveyed only if the two symbols are within resources for which the UE may assume the same precoding being used.

For DMRS associated with a PBCH, the channel over which a PBCH symbol on one antenna port is conveyed can be inferred from the channel over which a DMRS symbol on the same antenna port is conveyed only if the two symbols are within an SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A UE may assume that SS/PBCH blocks transmitted with the same block index on the same center-frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DMRS within the same code division multiplexing (CDM) group are quasi co-located with respect to Doppler shift, Doppler spread, average delay, delay spread, and spatial Rx. The UE may also assume that DMRS ports associated with a PDSCH are quasi co-located (QCL) with QCL Type A, Type D (when applicable) and average gain. The UE may further assume that no DMRS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DMRS ports of the PDSCH, the DMRS port of PDCCH or the CSI-RS port(s) of a CSI-RS resource.

The QCL relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi-co-location types corresponding to each DL RS are given by the higher layer parameter qcl-Type in QCL-Info and may take one of the following values: "QCL-TypeA": {Doppler shift, Doppler spread, average delay, delay spread}; "QCL-TypeB": {Doppler shift, Doppler spread}; "QCL-TypeC": {Doppler shift, average delay}; and "QCL-TypeD": {Spatial Rx parameter}.

The UE receives a medium access control control-element (MAC-CE) activation command to map up to N (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g., $n+3N_{slot}^{subframe,\mu}$.

Inter-cell interference coordination has the task to manage radio resources such that inter-cell interference is kept under control. Inter-cell interference coordination (ICIC) mechanism includes a frequency domain component and time domain component. ICIC is inherently a multi-cell radio resource management (RRM) function that needs to take into account information (e.g., the resource usage status and traffic load situation) from multiple cells. The preferred ICIC method may be different in the uplink and downlink.

The frequency domain ICIC manages radio resource, notably the radio resource blocks, such that multiple cells coordinate use of frequency domain resources.

In time division duplexing (TDD), intended UL-DL configuration may be exchanged through backhaul signalling, and frequency domain ICIC information may be exchanged per subframe set, such that multiple cells may coordinate the usage of frequency domain resources in the subframe sets.

For the time domain ICIC, subframe utilization across different cells are coordinated in time through backhaul signalling or operations, administration and management (OAM) configuration of so called almost blank subframe (ABS) patterns. The ABSs in an aggressor cell are used to protect resources in subframes in the victim cell receiving strong inter-cell interference. ABSs are subframes with reduced transmit power (including no transmission) on some physical channels and/or reduced activity. The eNB ensures backwards compatibility towards UEs by transmitting necessary control channels and physical signals as well as system information.

Patterns based on ABSs are signalled to the UE to restrict the UE measurement to specific subframes, called measurement resource restrictions. There are different patterns depending on the type of measured cell (serving or neighbour cell) and measurement type (e.g., RRM, radio link monitoring (RLM)). Multicast-broadcast single-frequency network (MBSFN) subframes can be used for time domain ICIC when the MBSFN subframes are also included in ABS patterns. The eNB cannot configure MBSFN subframes as ABSs when these MBSFN subframes are used for other usages (e.g., MBMS, LCS).

Extending the coverage of a cell by means of connecting a UE to cell that is weaker than the strongest detected cell is referred to as cell range extension (CRE). With time domain ICIC, a CRE UE may continue to be served by a victim cell (i.e., the weaker cell) even while under strong interference from aggressor cells (i.e., the stronger cell).

A UE under strong interference from aggressor cells may need to mitigate interference from the aggressor cells on some physical channels and signals in order to receive data from serving cell or to detect the weak cells or to perform measurements on the weak cells.

The network may provide SIB1 to the UE in the CRE region by a dedicated RRC signalling to assist UE system information acquisition.

ICIC is located in the eNB.

For the UE to measure "protected" resources of the serving cell and/or neighbour cells, RRM/RLM/CSI measurement resource restriction is signalled to the UE. There are three kinds of measurement resource restriction patterns that may be configured for the UE. In one example of pattern 1, a single RRM/RLM measurement resource restriction for the PCell is provided. In another example of pattern 2, a single RRM measurement resource restriction for indicated list of neighbour cells operating in the same carrier frequency as the PCell is provided. In yet another example of pattern 3, resource restriction for CSI measurement of the PCell is provided. In such example, if configured, two subframe subsets are configured per UE. The UE reports CSI for each configured subframe subset.

In the aforementioned example of pattern 3, it is up to the network to choose the two subframe subsets but typically the two subframe subsets are chosen with the expectation that CSI measurements using the two configured subframe subsets are subject to different levels of interference (e.g., one subframe subset indicates ABSs while the second subframe subset indicates non-ABSs). For periodic CSI reports, linkage of each CSI report to a configured subset of subframe is defined in TS 36.331. For aperiodic CSI reports, the UE reports CSI based on the subframe subset containing the CSI reference resource.

In RRC_CONNECTED, the RRM/RLM/CSI measurement resource restrictions are configured by dedicated RRC signalling.

The network may configure the UE with CRS assistance information of the aggressor cells in order to aid the UE to mitigate the interference from CRS of the aggressor cells.

When the time-domain inter-cell interference coordination is used for non-members UE in close proximity of a closed subscription group (CSG) cell, OAM configures a CSG cell not to use a time domain resource set (i.e., a set of subframes), so that a non-member UE in close proximity of the CSG cell can be still served by another cell. OAM also configures a cell neighbour to a CSG cell with the protected time domain resource set not used by the CSG cell, so that the neighbour cell knows which time domain resource can be used for a non-member UE in close proximity of the CSG cell.

When the time-domain inter-cell interference coordination is used to mitigate interference between two cells, for example using X2 signalling of ABS patterns from an interfering eNB to an interfered eNB, the following OAM requirements are applied.

In one example, OAM may configure association between eNBs to use the time-domain inter-cell interference coordination.

In one example, for the deployment scenarios where common subset for ABS patterns from multiple interfering cells is desirable, OAM configuration ensures that a "common subset" exists between the ABS patterns of those interfering cells.

The possibility of whether the common ABS pattern from multiple eNBs is desirable or not depends on the deployment cases of the time domain solution of inter-cell interference coordination.

It is up to eNB implementation how a receiving eNB derives the "usable ABS subset" from the ABS patterns coming from multiple neighbour eNBs.

The eNB using cell on/off may adaptively turn the downlink transmission of a cell on and off. A cell whose downlink transmission is turned off may be configured as a deactivated secondary cell (SCell) for a UE. A cell performing on/off may transmit only periodic discovery signals and UEs may be configured to measure the discovery signals for RRM. Cell on/off may be performed for the purpose of e.g., inter-cell interference coordination and avoidance, load balancing, and energy saving, etc. The criteria used for cell on/off may be e.g., traffic load increase/decrease, UE arrival/departure (i.e., UE-cell association), and packet arrival/completion.

A UE performs RRM measurement and may discover a cell or transmission point of a cell based on discovery signals when the UE is configured with discovery-signal-based measurements.

Inter-cell interference coordination in evolved-universal terrestrial radio access network (E-UTRAN) is performed through the X2 interface. In case of variation in the interference conditions, the eNB signals the new condition to the neighbour eNBs e.g., the neighbour eNBs for which an X2 interface is configured due to mobility reasons.

When the time-domain inter-cell interference coordination is used to mitigate interference, the eNB signals ABS patterns to the neighbour eNBs, so that the receiving eNB can utilize the ABS of the sending eNB with less interference.

A typical use case of the time-domain solution of inter-cell interference coordination is the one where an eNB providing broader coverage (macro-cell) and therefore being more capacity constrained determines ABS patterns and indicates them to eNBs, providing smaller coverage (small cells) residing in the eNB's area.

When inter-eNB CoMP is used, the eNB signals the CoMP hypotheses and associated benefit metrics to the neighbour eNB(s), so that the receiving eNB may take them into account for RRM.

The Load indication procedure is used to transfer interference co-ordination information between neighbouring eNBs managing intra-frequency cells, and adjacent frequency TDD cells.

The X2 user plane interface (X2-U) is defined between eNBs. The X2-U interface provides non-guaranteed delivery of user plane PDUs. The user plane protocol stack on the X2 interface is shown in LTE standard specification. The transport network layer is built on IP transport and general packet radio service (GPRS) tunnelling protocol (GTP-U) is used on top of user datagram protocol/internet protocol (UDP/IP) to carry the user plane protocol data units (PDUs).

The X2-U interface protocol stack is identical to the S1-U protocol stack.

For DC, if X2-U user data bearers are associated with E-UTRAN radio access bearers (E-RABs) for which the split bearer option is configured, GTP-U conveys packet data convergence protocol (PDCP) PDUs in uplink and downlink and a RAN container containing flow control information. The RAN Container is carried in the "RAN container" field of the GTP-U extension header.

The flow control function is applied when an E-RAB is configured for the split bearer option and only for DL i.e., the flow control information is provided only by the secondary eNB (SeNB) to the master eNB (MeNB) for the MeNB to control the downlink user data flow to the SeNB. The flow control function is further described in TS 36.425.

The X2 control plane interface (X2-CP) is defined between two neighbour eNBs. The transport network layer is built on stream control transmission protocol (SCTP) on top of IP. The application layer signalling protocol is referred to as X2-AP (X2 application protocol).

A single SCTP association per X2-C interface instance may be used with one pair of stream identifiers for X2-C common procedures. Only a few pairs of stream identifiers may be used for X2-C dedicated procedures.

Source-eNB communication context identifiers that are assigned by the source-eNB for X2-C dedicated procedures, and target-eNB communication context identifiers that are assigned by the target-eNB for X2-C dedicated procedures, may be used to distinguish UE specific X2-C signalling transport bearers. The communication context identifiers are conveyed in the respective X2AP messages.

RNs terminate X2-AP. In this case, there is one X2 interface relation between the RN and the donor eNB (DeNB).

TDD enhanced interference management and traffic adaptation (eIMTA) allows adaptation of uplink-downlink configuration via L1 signalling. The E-UTRAN configures which UEs are subject to the TDD eIMTA operation.

For Uplink scheduling and HARQ timing, the UE follows the reference uplink-downlink configuration based on the one provided in SIB1. For downlink HARQ timing, the UE follows the reference uplink-downlink configuration provided through dedicated signalling.

Downlink subframes in the reference configuration provided in SIB1 remain unchanged whereas only a subset of uplink and special subframes may be reconfigured to downlink subframes. E-UTRAN sends a L1 signalling to the UE on primary cell (PCell) PDCCH to indicate which uplink-downlink configuration defined in TS 36.211 is currently used for one or more serving cell(s). This uplink-downlink configuration provided by the L1 signalling applies for an RRC-configured number of radio frames.

The UE uses the L1-signalled uplink-downlink configuration for (E)PDCCH monitoring and CSI measurements.

The UE RRM/RLM measurements are not affected by the TDD eIMTA configuration.

For DL CSI measurements of each serving cell, two subframe sets may be configured via RRC signalling.

For PUSCH/surrounding reference signal (SRS) UL power control of each serving cell, two subframe sets with separate power control parameters may be configured via RRC signalling.

Subframe-set dependent overload indication and uplink-downlink configuration intended to be used by a cell may be exchanged between eNBs over the X2 interface to facilitate the TDD eIMTA operation.

A UE that supports network assisted interference cancelation/suppression (NAICS) receiver functionality can mitigate PDSCH and CRS interference from aggressor cells in order to better receive a PDSCH from a serving cell.

The network may configure the UE with NAICS information of the aggressor cells in order to help the UE to mitigate the PDSCH and CRS interference of the aggressor cells. To support NAICS, an eNB may exchange NAICS information with neighbour eNBs through X2 signalling.

A homogenous network scenario, which involves operation of multiple neighboring macro cells, in a same frequency band, can benefit from inter-cell interference coordination and protection of resources. In such cases, reserving reduced activity slots and more generally protected time/frequency/spatial resources are beneficial to cell-edge UEs of neighboring cell, since the reserving reduced activity slots and more generally protected time/frequency/spatial resources can operate with less/no interference and experience a higher communication rate without a need for modulation coding scheme (MCS) reduction or rate matching and so on. This can be especially useful for operation in lower frequency bands, such as below 1 GHz.

Dominant interference condition may happen when non-member UEs are in close proximity of a CSG cell. Depending on network deployment and strategy, it may not be possible to divert the UEs suffering from inter-cell interference to another E-UTRA carrier or other RAT. Time domain ICIC may be used to allow such non-member UEs to remain served by the macro cell on the same frequency layer.

Such interference may be mitigated by the CSG cell utilizing ABSs to protect the corresponding macro cell's subframes from the interference. A non-member UE may be signalled to utilize the protected resources for cell measurements (RRM), RLM and CSI measurements for the serving macro cell, allowing the UE to continue to be served by the macro cell under strong interference from the CSG cell.

In RRC_CONNECTED, the network can find out that the UE is subject to dominant interference from a CSG cell, which the UE is not a member of, through the existing measurement events (defined in LTE release 8/9), at which point the network may choose to configure the RRM/RLM/CSI measurement resource restriction for the UE. The network may also configure RRM measurement resource restriction for neighbour cells in order to facilitate mobility from the serving macro cell. The network may release the RRM/RLM/CSI measurement resource restriction when the network detects that the UE is no longer severely interfered by the CSG cell.

Time domain ICIC may be utilized for pico UEs that are served in the edge of the serving pico cell, e.g., for traffic off-loading from a macro cell to a pico cell. Time domain ICIC may be utilized to allow such UEs to remain served by the pico cell on the same frequency layer.

Such interference may be mitigated by the macro cell(s) utilizing Almost Blank Subframes to protect the corresponding pico cell's subframes from the interference. A UE served by a pico cell uses the protected resources for RRM, RLM, and CSI measurements for the serving pico cell.

For a UE served by a pico cell, the RRM/RLM/CSI measurement resource restriction may allow more accurate measurement of pico cell under strong interference from the macro cell(s). The pico cell may selectively configure the RRM/RLM/CSI measurement resource restriction only for those UEs subject to strong interference from the macro cell(s). Also, for a UE served by a macro cell, the network may configure RRM measurement resource restriction for neighbour cells in order to facilitate mobility from the macro cell to a pico cell.

When different TDD DL/UL patterns are used between neighbouring cells, UL transmission in one cell may interfere with DL reception in another cell: this is referred to as cross link interference (CLI).

To mitigate CLI, gNBs can exchange and coordinate their intended TDD DL-UL configurations over Xn and F1 interfaces; and the victim UEs can be configured to perform CLI measurements. There are two types of CLI measurements: SRS-RSRP measurement in which the UE measures SRS-RSRP over SRS resources of aggressor UE(s); and CLI-RSSI measurement in which the UE measures the total received power observed over RSSI resources.

Layer 3 filtering applies to CLI measurement results and both events triggered, and periodic reporting are supported.

Xn is a network interface between NG-RAN nodes.

The Xn user plane (Xn-U) interface is defined between two NG-RAN nodes. The transport network layer is built on IP transport and GTP-U is used on top of UDP/IP to carry the user plane PDUs.

Xn-U provides non-guaranteed delivery of user plane PDUs and supports the following functions: data forwarding; and flow control.

Further details of Xn-U can be found in TS 38.420.

The Xn control plane interface (Xn-C) is defined between two NG-RAN nodes. The transport network layer is built on SCTP on top of IP. The application layer signalling protocol is referred to as Xn application protocol (XnAP). The SCTP layer provides the guaranteed delivery of application layer messages. In the transport IP layer point-to-point transmission is used to deliver the signalling PDUs.

The Xn-C interface supports the following functions: Xn interface management; UE mobility management, including context transfer and RAN paging; and Dual connectivity. Further details of Xn-C can be found in TS 38.420.

The load reporting function is executed by exchanging load information over the Xn/X2/F1/E1 interfaces.

The following load related information may be supported which comprises: radio resource usage (per-cell and per SSB area PRB usage: DL/UL GBR PRB usage, DL/UL non-GBR PRB usage, DL/UL total PRB usage, and DL/UL scheduling PDCCH CCE usage); transport network layer (TNL) capacity indicator (UL/DL TNL offered capacity and available capacity); cell capacity class value (UL/DL relative capacity indicator); capacity value (per cell, per SSB area and per slice: UL/DL available capacity); HW capacity indicator (offered throughput and available throughput over E1, percentage utilisation over F1); RRC connections (number of RRC connections, and available RRC connection capacity); and a number of active UEs.

To achieve load reporting function, resource status reporting initiation & resource status reporting procedures are used.

The SSB consists of primary and secondary synchronization signals (primary synchronization signal (PSS), secondary synchronization signal (SSS)), each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by sub-carrier spacing and the periodicity of the half-frames where SSBs are transmitted is configured by the network. During a half-frame, different SSBs may be transmitted in different spatial directions (i.e., using different beams, spanning the coverage area of a cell).

Within the frequency span of a carrier, multiple SSBs can be transmitted. The physical cell identifiers (PCIs) of SSBs transmitted in different frequency locations do not have to be unique, i.e., different SSBs in the frequency domain can have different PCIs. However, when an SSB is associated with an RMSI, the SSB corresponds to an individual cell, which has a unique NR cell global identifier (NCGI). Such an SSB is referred to as a cell-defining SSB (CD-SSB). A PCell is associated to a CD-SSB located on the synchronization raster.

Polar coding and QPSK modulation are used for MIB provided by the PBCH. The UE may assume a band-specific sub-carrier spacing for the SSB unless a network has configured the UE to assume a different sub-carrier spacing. PBCH symbols carry the PBCH's own frequency multiplexed DMRS. The PBCH physical layer model is described in TS 38.202.

The MIB on PBCH provides the UE with parameters (e.g., control resource set (CORESET) #0 configuration) for monitoring of PDCCH for scheduling PDSCH that carries the SIB1. PBCH may also indicate that there is no associated SIB1, in which case the UE may be pointed to another frequency from where to search for an SSB that is associated with a SIB1 as well as a frequency range where the UE may assume no SSB associated with SIB1 is present. The indicated frequency range is confined within a contiguous spectrum allocation of the same operator in which SSB is detected.

The following identities are used in NG-RAN for identifying a specific network entity: AMF name used to identify an AMF; and NCGI used to identify NR cells globally. The NCGI is constructed from the public land mobile network (PLMN) identity the cell belongs to and the NR cell identity (NCI) of the cell. The PLMN ID included in the NCGI may be the first PLMN ID within the set of PLMN IDs associated to the NR cell Identity in SIB1, following the order of broadcast.

How to manage the scenario where a different PLMN ID has been allocated by the operator for an NCGI is left to OAM and/or implementation: a gNB identifier (gNB ID) used to identify gNBs within a PLMN. The gNB ID is contained within the NCI of the gNB's cells; and a global In one example, single network slice selection assistance information (S-NSSAI) is used to identify a network slice. In one example, network identifier (NID) identifies a standard non-public network (SNPN) in combination with a PLMN ID. In one example, closed access group identifier is used to identify a closed access group (CAG) within a PLMN.

For a UE in RRC_CONNECTED state, the BWPs configured to the UE by a serving cell may overlap in the frequency domain with the BWPs configured for other UEs by other cells within a carrier. Multiple SSBs may also be transmitted within the frequency span of a carrier used by the serving cell. However, from the UE perspective, each serving cell is associated to at most a single SSB. There can be a scenario with multiple SSBs in a carrier, i.e., SSB1, SSB2, SSB3 and SSB4, identifying two different cells (NCGI=5, associated to SSB1, and NCGI=6, associated to SSB3) with overlapping BWPs, and where RRM measurements can be configured to be performed by the UE on each of the available SSBs, i.e., SSB1, SSB2, SSB3 and SSB4.

There are 1008 unique physical-layer cell identities given by:

$$N_{ID}^{cell} = 3N_{ID}^{(1)} + N_{ID}^{(2)}$$

where $N_{ID}^{(1)} \in \{0, 1, \ldots, 335\}$ and $N_{ID}^{(2)} \in \{0, 1, 2\}$.

A method for indication of a group of symbols, e.g., for a PDSCH/PUSCH transmission, is using a start and length indicator value (SLIV) as follows. A number of consecutive symbols L counting from the starting symbol S (e.g., allocated for a PDSCH/PUSCH) are determined from the start and length indicator SLIV:

if $(L-1) \leq 7$ then $$SLIV = 14 \cdot (L-1) + S$$

else $$SLIV = 14 \cdot (14-L+1) + (14-1-S) \text{ where } 0 < L \leq 14-S.$$

The PDSCH/PUSCH mapping type is set to Type A or Type B basically based on whether the transmission starts at the beginning of a slot or in the middle of a slot and is fully defined with details in clause 7.4.1.1.2 of [TS 38.211]. TABLE 1 shows valid S and L combinations.

TABLE 1

Valid S and L combinations

| PDSCH/PUSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, ..., 13} | {2, ..., 14} | {0, ..., 10} | {2, 4, 6} | {2, ..., 12} |

(Note 1):
S = 3 is applicable only if dmrs-TypeA-Position = 3 gNB ID used to identify gNBs globally. The Global gNB ID is constructed from the PLMN identity the gNB belongs to and the gNB ID. The mobile country code (MCC) and mobile network code (MNC) are the same as included in the NCGI.

It is not precluded that a cell served by a gNB does not broadcast the PLMN ID included in the global gNB ID. In one example, tracking area identity (TAI) is used to identify tracking areas. The TAI is constructed from the PLMN identity the tracking area belongs to and the tracking area code (TAC) of the tracking area (TA).

Although the focus of the present disclosure is on inter-cell interference, e.g., for UEs at the edge of two or multiple cells, "interference" can be considered to apply to other spatial units/entities, such as TRPs, TPs, distributed units (DUs), remote units (RUs), Access units (AUs), remote radio heads (RRHs), beams and so on, e.g., for UEs at the edge of two or multiple TRPs/TPs/DUs/RUs/RRHs/AUs/RRHs/beams and so on, such that inter-TRP/inter-TP/inter-DU/inter-RU/inter-AU/inter-RRH/inter-beam interference and so on, can be considered as well.

Various embodiments of the present disclosure consider two gNBs and/or the two corresponding cells operating in a same frequency band/carrier, wherein a first gNB/cell is causing interference and a second gNB/cell, and/or some UEs such as cell-edge UEs served by the second gNB/cell, is/are experiencing interference. The former gNB/cell can be referred to as an aggressor gNB/cell, and the latter gNB/cell can be referred to as a victim gNB/cell. In some scenarios, inter-cell interference can be mainly by one gNB/cell to the other gNB/cell (e.g., only the first gNB/cell to the second gNB/cell), such as in heterogeneous networks, e.g., a macro cell interfering a small/micro/pico cell, due to different transmission power levels.

In some other scenarios, inter-cell interference impacts both gNBs/cells, e.g., the first gNB causes interference to the second gNB/cell and associated (cell-edge) UEs, and the second gNB/cell causes interference to the first gNB/cell and associated (cell-edge) UEs, such as in a homogeneous network, e.g., two macro cells with comparable transmission power levels interfering with each other (and their associated UEs).

In one embodiment of E-1, a coordination between aggressor and victim gNBs about inter-cell interference protection levels is provided.

In one embodiment, when two (neighbor) cells operate in a same frequency band/carrier, a first gNB such as an aggressor gNB can indicate to a second gNB such as a victim gNB how much protection is provided for different time/frequency/spatial resources, in terms of how much inter-cell interference may be caused by the aggressor gNB and/or experienced by the victim gNB. Such an indication can be reported as an Xn message or information elements between the two gNBs (or as an F1 message/IE between different parts of a split gNB, e.g., for the case of inter-TRP interference coordination).

Accordingly, the first gNB minimizes or eliminates all inter-cell interference for some time/frequency/spatial resource(s) by minimizing or totally avoiding all transmissions by the first gNB in the time/frequency/spatial resources to facilitate scheduling opportunities for victim cell(s) such as cell-edge UEs of victim gNB(s). Such time/frequency/spatial resources are referred to as reduced activity allocation (RAA) or reduced activity resources (RAR). On the other hand, the first gNB schedules and/or configures transmissions such as UL/DL/SL more freely and flexibly in time/frequency/spatial resources that are less or not protected.

In one example, a first set of time/frequency/spatial resources can have a "first/highest level interference protection" or "most/highest/full protection" if the first gNB such as the aggressor gNB avoids all transmission and receptions, such as dynamically scheduled/triggered transmissions as well as UE-specific and cell-specific configured transmissions, in those time/frequency/spatial resources.

In another example, a second set of time/frequency/spatial resources can have a "second level interference protection" or "very protected" if the first gNB such as the aggressor gNB avoids most transmissions except possibly for a very limited set of transmissions and with a limited transmission activity level, e.g., only cell-specific configured transmissions possibly with a transmission power level below a first threshold and/or transmission duration below a second threshold and/or transmission periodicity longer than a third threshold, and so on. Similar, other levels of inter-cell interference protection can be considered.

In one example, transmission activity threshold and corresponding interference protection levels can depend on different KPIs associated with transmission(s) that can be/are scheduled or configured in a time/frequency/spatial resource, such as service/traffic type e.g., eMBB vs. URLLC, or UE density e.g., number of (active) UEs such as number of (active) UEs that share the resource and/or can receive/transmit using the resource, or latency/throughput requirements, and so on.

According to the present embodiment of E-1, the first gNB such as the aggressor gNB can indicate, for each time and/or frequency and/or spatial resource, an inter-cell interference protection level from a number of two or more protection levels. For example, the first gNB can indicate multiple protection levels ranging progressively in interference protection from "no protection" to "medium protection" to "full protection." In one example, there are only two protection levels, such as "fully protected" (or simply, "protected") resources and "not protected" resources (for which there is no interference protection and/or no guarantee for the interference protection level).

In another example, the first gNB can indicate protection levels using a numerical metric such as an [N]-bit string, e.g., with N=1, 2, 3 wherein each value of the bit string maps to a predefined interference protection level e.g., an all-zero string can correspond to no protection, so that the aggressor gNB can, e.g., freely transmit with any transmission power level and so on, and an all-one string can correspond to full/highest protection so that the aggressor gNB can e.g., entirely avoid the resource and/or limit a transmission to a minimum level, or using a range such as a percentage, e.g., a number in the range [0, . . . , 100] wherein each value indicates an interference protection level, e.g., a value 0 can indicate no protection and a value of 100 can indicate a full protection, as discussed above. For example, a determination/calculation of such an interference protection level/value can be based on a predetermined rule or formula in the specification, possibly with configurable parameters, or can be left to gNB implementation.

According to the present embodiment of E-1, the first gNB such as the aggressor gNB can provide inter-cell interference protection levels based on an allocation granularity of time/frequency/spatial resources.

For example, the first gNB can indicate time resources in absolute time units such as in the unit of a millisecond or a fraction of a millisecond. For example, the first gNB can indicate time resources in units of slots per NR standard for a reference sub-carrier spacing (SCS) configuration, or in units smaller than one slot such as per (OFDM) symbol and/or per groups of symbols with a configured value for the sub-slot length, e.g., 2, 3, 4, 7 symbols, e.g., as referred to as sub-slots, possibly using a PUSCH/PDSCH mapping type A or B, therefore counting the entire time domain resources in terms of sub-slots, instead of slots. For example, the first gNB can indicate that a first symbol/sub-slot/slot is highly or more protected, and a second symbol/sub-slot/slot is less or not protected.

In another example, the first gNB can indicate frequency resources in absolute time units such as one MHz. In another example, the first gNB can indicate frequency resources in units of resource blocks (RBs) or per groups of RBs within a carrier for a reference SCS such as per physical/virtual resource block groups (RBGs) based on a predetermined/preconfigured definition of RBGs (e.g., a number of RBs/PRBs/virtual resource blocks (VRBs) within an RBG) or per narrowband (NB) or per BWP.

A narrowband/BWP can refer to, e.g., a predetermined/preconfigured slice/portion of contiguous frequency spectrum within a carrier bandwidth with a predetermined/ preconfigured bandwidth or can refer to, e.g., a BWP configured to a UE or commonly configured to a group of multiple UEs (possibly in a transparent manner, i.e., the multiple UEs within the group may or may not be aware of such common configuration) operating in the corresponding cell, including an indication of the BWP to the second gNB, or to a union or intersection or other combination(s) of BWPs configured to a UE or a group of multiple UEs operating in the corresponding cell, or per groups of one or multiple subcarriers with a predetermined/configured size, or with an indication of the starting subcarrier in the group and the length/number of subcarriers in the group that can potentially change from one group to the other. For example, the first gNB can indicate that a first RB/RBG/BWP is highly or more protected, and a second RB/RBG/BWP is less or not protected.

In yet another example, the first gNB can indicate inter-cell interference protection levels for different time/frequency resources per spatial direction or per spatial areas/units. For example, when a gNB transmits more than one SSB (within a SSB burst set) in a cell, the first gNB can indicate interference protection levels based on spatial resources, e.g., based on an SSB index and/or a corresponding SSB index, such as a geographical/directional/coverage area associated with a transmission direction of that SSB. According to this example, a mapping between the SSBs (within a SSB burst set) of the first cell and the spatial directions can be indicated by the first gNB to the second gNB or can be determined by the second gNB/cell implementation with or without UE assistance. In another example, a set of spatial directions are predetermined or (pre-)configured and the first gNB indicates inter-cell interference protection levels for different time/frequency resources directly per the predetermined/configured spatial directions without an explicit linkage to beams or reference signals such as SSBs, which can be handled by lower layers and can be transparent to higher layers.

In one example, a set of protected resources are defined/configured only in one resource allocation domain, such as only in time-domain. For example, a set of protected resources can include a set of slots/sub-slots/symbols, so that the entire channel/carrier bandwidth is considered as protected (or variants thereof, e.g., "full protection," "high protection," "moderate protection," and so on) during that set of slots/sub-slots/symbols. In such a case, the set of time-domain protected resource can be referred to as "reduced activity slots/symbols (RAS)."

In one example, a RAS or a set of RASs can be associated with only one interference protection level, while in another example, the first/aggressor gNB can configure multiple RASs or multiple sets of RASs, each associated with a different interference protection level and a corresponding different level of activity reduction, e.g., different levels/durations/amounts of transmission activity within those RASs.

In one example, a configuration and indication of time/frequency/spatial resources with a given inter-cell interference protection level and/or with reduced activity can be within a predetermined or configured time window, after/beyond which a same pattern of resource/slots is repeated. According to this example, a duration of such a time window can be based on one or more of the TDD UL/DL pattern configurations, a (maximum/average) HARQ timeline value(s) configuration, a configured periodicity for SSB, and so on. In one example, a frequency domain window can be additionally or alternatively considered in a similar manner.

In one example, an indication for interference protection levels is provided using a bitmap corresponding to all time/frequency resources, wherein a first M number of bits corresponds to a first time/frequency resource, a second M number of bits corresponds to a second time/frequency resource, and so on. The bitmap can be applicable per spatial unit, such as per SSB, if more than one SSB is transmitted in the cell. In another example, an indication is only provided for one or some groups of protection levels, e.g., only time/frequency/spatial resources with full/high/more protection, e.g., so that other time/frequency/spatial resources are considered to be provided with less/no interference protection.

In one example, a time/frequency/spatial resource is indicated explicitly based on a slot index, a RB index, an SSB index, and so on, such as a finer/coarser allocation, e.g., symbol/sub-slot/NB/BWP/sub-RB and so on as discussed before. For example, a first/aggressor gNB can indicate (e.g., over an Xn interface) to a second/victim gNB one or multiple explicit list(s) of time/frequency/spatial resources along with an attribute/index/metric that captures the interference protection level provided for each list of resources.

In one example, a list of resources can include a list of time domain allocations such as a list of indicated symbols within indicated slot, e.g., based on a parameter same as or similar to SLIV, wherein a start and a length of a group of consecutive symbols are jointly coded into a single value, so that the size and placement of the group of symbols can be flexibly indicated and those properties can change from one group of symbols to another group of symbols. A group of symbols can follow a configured/indicated mapping type, such as PUSCH/PDSCH mapping type B, or can be using a default/predetermined mapping Type such as mapping Type B.

Such time domain allocations can be along with or without any frequency and/or spatial domain allocation/restriction. In another example, a list of resources can include a list of frequency domain allocations such as a list of subcarrier groups with an indication of the starting subcarrier in the group and the length/number of subcarriers in the group that can potentially change from one group to the other. Again, such frequency domain allocations can be along with or without any time and/or spatial domain allocation/restriction.

In one example, an indication for protection levels for time/frequency/spatial resources applies to a single indicated cell, and/or a list of predetermined and/or (pre-)configured cells, and/or a list of cells indicated along with the indication for protection level, wherein the list includes two or more cells, or without any explicit indication of recipient cells, so that the indication for protection levels for time/frequency/spatial resources applies to all cells or all predefined cells (e.g., per X2 configuration setup), or all cells receiving the indication.

Figure 6:
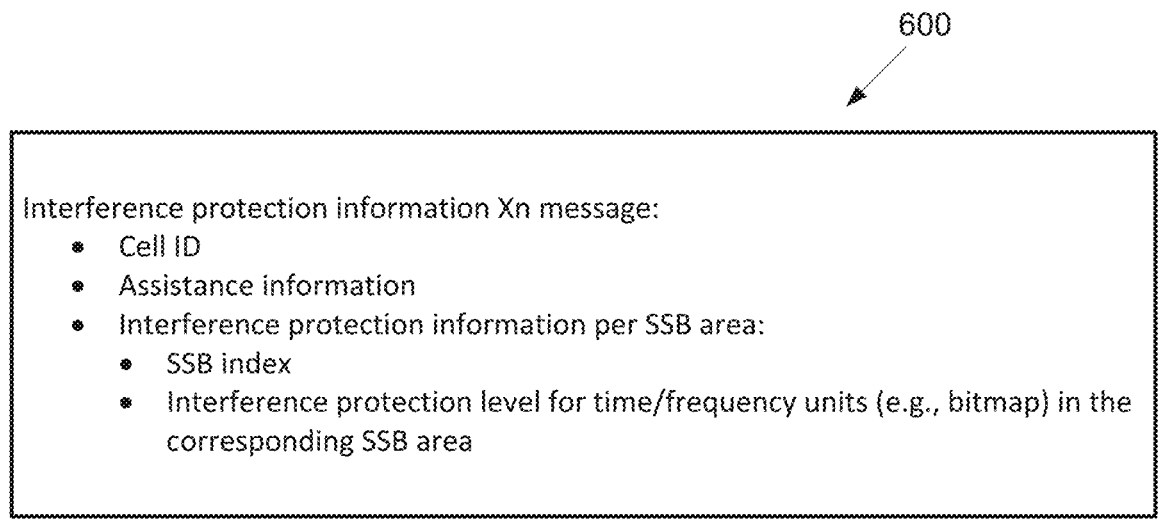
FIG. 6 illustrates an example Xn message/IE for inter-gNB coordination regarding interference protection levels for resources according to embodiments of the present disclosure.

FIG. 6 illustrates an example Xn message/IE for inter-gNB coordination 600 regarding interference protection levels for resources according to embodiments of the present disclosure. An embodiment of the Xn message/IE for inter-gNB coordination 600 shown in FIG. 6 is for illustration only.

FIG. 6 shows an example Xn message/IE for inter-gNB coordination regarding interference protection levels for resources. Such an Xn message/IE can be part of an existing Xn message/IE such as "radio resource status" or can be a separate message/IE, e.g., "interference protection information." Such information element can include a cell ID, such as PCI and/or a CGI and so on, e.g., corresponding to the first/aggressor gNB. The information element can additionally include assistance information for the IE, e.g., threshold values, such as thresholds corresponding to transmission likelihood/probability, transmission power, and so on, used for determination of different interference protection levels.

In addition, assistance information can include the length of the time/frequency window over which interference protection levels are reported, as well as the units of time/frequency resources for which interference protection levels are reported. The main entry of the information element can include interference protection information, which can be, e.g., per SSB or per SSB area in case there is more than one SSB (in a SSB burst set) corresponding to the cell. Herein, an interference protection information can include, e.g., information regarding an interference protection level from among a set of predetermined/preconfigured interference protection levels corresponding to a list of time domain and/or frequency domain resources that can further correspond to a SSB index and/or SSB area, wherein the list can be based on indication of time/frequency units such as by using a bitmap or a percentage string as discussed previously, or a list can be explicitly indicated such as by indication of time unit(s) and/or frequency unit(s), e.g., per symbol/sub-slot/slot and/or per RB/RBG/BWP.

If the interference protection information is per SSB and/or per SSB area, then an SSB index (e.g., in the range 0 to 63) can be also included along with the corresponding interference protection information such as the bitmap. In one example, if a certain SSB index is not included in the actually transmitted SSB(s) within an SSB burst set, then the interference protection information can be excluded for that SSB index. In another example, a directional/angular information of gNB beams such as SSB beams (such as azimuth and elevation angles, geography of coverage area, and so on) are additionally included. In yet another example, spatial domain information can be with respect to directional/spatial/angular/geographical regions, e.g., based on predetermined or (pre-)configured set of angles/directions, e.g., 8 regions each covering a 45-degree planar area with a global/local orientation e.g., with an alignment with the North direction. According to this example, a mapping of gNB beams e.g., spatial transmission filters associated with SSBs and/or CSI-RS, with the predetermined or (pre-)configured set of angles/directions is left up to gNB implementation (in lower layers). In one example, spatial-domain interference coordination such as beam-level/per SSB area reporting of interference protection levels are excluded, and information protection levels are only reported for the time/frequency domain resources without spatial distinction.

TABLE 2A and TABLE 2B provide example Xn interface messages for inclusion in [TS 38.423] that implement details of the structure provided in FIG. 6. The two tables include similar information, except that TABLE 2A considers spatial domain coordination of gNBs by reporting per SSB information protection levels (including SSB indices), while TABLE 2B excludes such spatial/beam/SSB information.

Similar messages can be considered for the F1 interface for inclusion in [TS 38.473], e.g., for the case of inter-TRP interference coordination.

TABLE 2A

| IE/Group Name | Presence | Range | IE type and reference | Semantics description |
|---|---|---|---|---|
| NR CGI | | | 9.2.2.7 | |
| NR PCI | | | INTEGER (0 . . . 1007, . . .) | |
| Interference protection assistance information List | | 1 | | |
| >Periodicity of the list | | | ENUMERATED (sl5, sl10, sl20, sl40, sl80, sl160, sl320, sl640, . . .) | The length of the time window over which interference protection levels are reported. Values "sl5" represents 5 slots, "sl10, represents 10 slots, and so on, in the numerology of the serving cell. The protected resource pattern is continuously repeated, and it is valid until stated otherwise or until replaced by a new pattern. Can additionally include a starting SFN. Can additionally include a frequency-domain window for the list. |
| >Time domain resource unit | O | | ENUMERATED (sym1, sym2, sym3, sym4, sym7, slot, . . .) | Granularity of resources in the time domain, "sym1" refers to 1 symbols, "sym2" refers to 2 symbols, and so on. "slot" refers to resource granularity being one slot. If this IE is absent, a unit of slot is considered. |

TABLE 2A-continued

| IE/Group Name | Presence | Range | IE type and reference | Semantics description |
|---|---|---|---|---|
| >Frequency domain resource unit | O | | ENUMERATED (SC, RB, RBG, BWP, . . .) | Granularity of resources in the frequency domain. "SC" refers to one subcarrier, "RB" refers to a resource block, "RBG" refers to resource block group, "BWP" refers to a bandwidth part. If this IE is absent, information protection applies to the entire frequency span of the carrier associated with the cell. Can additionally include a numerology/subcarrier spacing for the reported frequency allocation. |
| >Thresholds for interference protection/ transmission activity determination | O | | ENUMERATED {0, 0p01, . . . , 0p99, 1} SIZE (2^N_levels + 1) Or ENUMERATED {0, 0p01, . . . , 0p99, 1} SIZE (101) | Threshold values that are used to determine the interference protection levels/transmission activity levels (e.g., transmission likelihood, transmission power). Value "0p01" represents 0.01, "0p99" represents 0.99, and so on. The number of thresholds is based on whether a bitmap or an integer string is used for indication of interference protection levels. |
| SSB area iinterference protection information list | | 1 | | The protected resource pattern is continuously repeated, and it is valid until stated otherwise or until replaced by a new pattern. |
| >SSB interference protection information Item | | 1 . . . <maxnoofSSBAreas> | | |
| >>SSB index | M | | INTEGER (0 . . . 63) | |
| >>SSB area interference protection level | M | | BIT STRING (SIZE (N_t × N_f × N_levels, . . .)) or INTEGER STRING {(0 . . . 100)}SIZE (N_t × N_f, . . .)) | Bitmap or integer string for indication of interference protection level per time/frequency unit. [N_t] and [N_f] refer to the number of time-domain units and the number of frequency-domain units, respectively, within the reporting window for Interference protection information. For bitmap indication, [N_levels] refers to the number of bits to indicate different information protection levels, e.g., all-zero refers to an all-zero string can correspond to no protection/guarantee, and an all-one string can correspond to full/high protection. For integer string |

TABLE 2A-continued

| IE/Group Name | Presence | Range | IE type and reference | Semantics description |
|---|---|---|---|---|
| | | | | indication, a value 0 can indicate no protection and a value of 100 can indicate a full protection |

TABLE 2B

| IE/Group Name | Presence | Range | IE type and reference | Semantics description |
|---|---|---|---|---|
| NR CGI | | | 9.2.2.7 | |
| NR PCI | | | INTEGER (0 . . . 1007, . . .) | |
| Interference protection assistance information list | | 1 | | |
| >Periodicity of the list | | | ENUMERATED (sl5, sl10, sl20, sl40, sl80, sl160, sl320, sl640, . . .) | The length of the time window over which interference protection levels are reported. Values "sl5" represents 5 slots. "sl10," represents 10 slots, and so on, in the numerology of the serving cell. The protected resource pattern is continuously repeated, and it is valid until stated otherwise or until replaced by a new pattern. Can additionally include a starting SFN. Can additionally include a frequency-domain window for the list. |
| >Time domain resource unit | O | | ENUMERATED (sym1, sym2, sym3, sym4, sym7, slot, . . .) | Granularity of resources in the time domain, "sym1" refers to 1 symbol, "sym2" refers to 2 symbols, and so on. "slot" refers to resource granularity being one slot. If this IE is absent, a unit of slot is considered. |
| >Frequency domain resource unit | O | | ENUMERATED (SC, RB, RBG, BWP, . . .) | Granularity of resources in the frequency domain. "SC" refers to one subcarrier, "RB" refers to a resource block, "RBG" refers to resource block group, "BWP" refers to a bandwidth part. If this IE is absent, information protection applies to the entire frequency span of the carrier associated with the cell. Can additionally include a numerology/subcarrier spacing for the reported frequency allocation. |
| >Thresholds for interference protection/ transmission | O | | ENUMERATED {0, 0p01, . . . , 0p99, 1} SIZE (2^N_levels + 1) Or | Threshold values that are used to determine the interference protection |

TABLE 2B-continued

| IE/Group Name | Presence | Range | IE type and reference | Semantics description |
| --- | --- | --- | --- | --- |
| activity determination | | | ENUMERATED {0, 0p01, . . . , 0p99, 1} SIZE (101) | levels/transmission activity levels (e.g., transmission likelihood, transmission power). Value "0p01" represents 0.01, "0p99" represents 0.99, and so on. The number of thresholds is based on whether a bitmap or an integer string is used for indication of interference protection levels. |
| Interference protection information list | | 1 | | The protected resource pattern is continuously repeated, and it is valid until stated otherwise or until replaced by a new pattern. |
| > interference protection level | M | | BIT STRING (SIZE (N_t × N_f × N_levels, . . .)) or INTEGER STRING {(0 . . . 100)}SIZE (N_t × N_f, . . .)) | Bitmap or integer string for indication of interference protection level per time/frequency unit. [N_t] and [N_f] refer to the number of time-domain units and the number of frequency-domain units, respectively, within the reporting window for Interference protection information. For bitmap indication, [N_levels] refers to the number of bits to indicate different information protection levels, e.g., all-zero refers to an all-zero string can correspond to no protection/guarantee, and an all-one string can correspond to full/high protection. For integer string indication, a value 0 can indicate no protection and a value of 100 can indicate a full protection |

Figure 7:
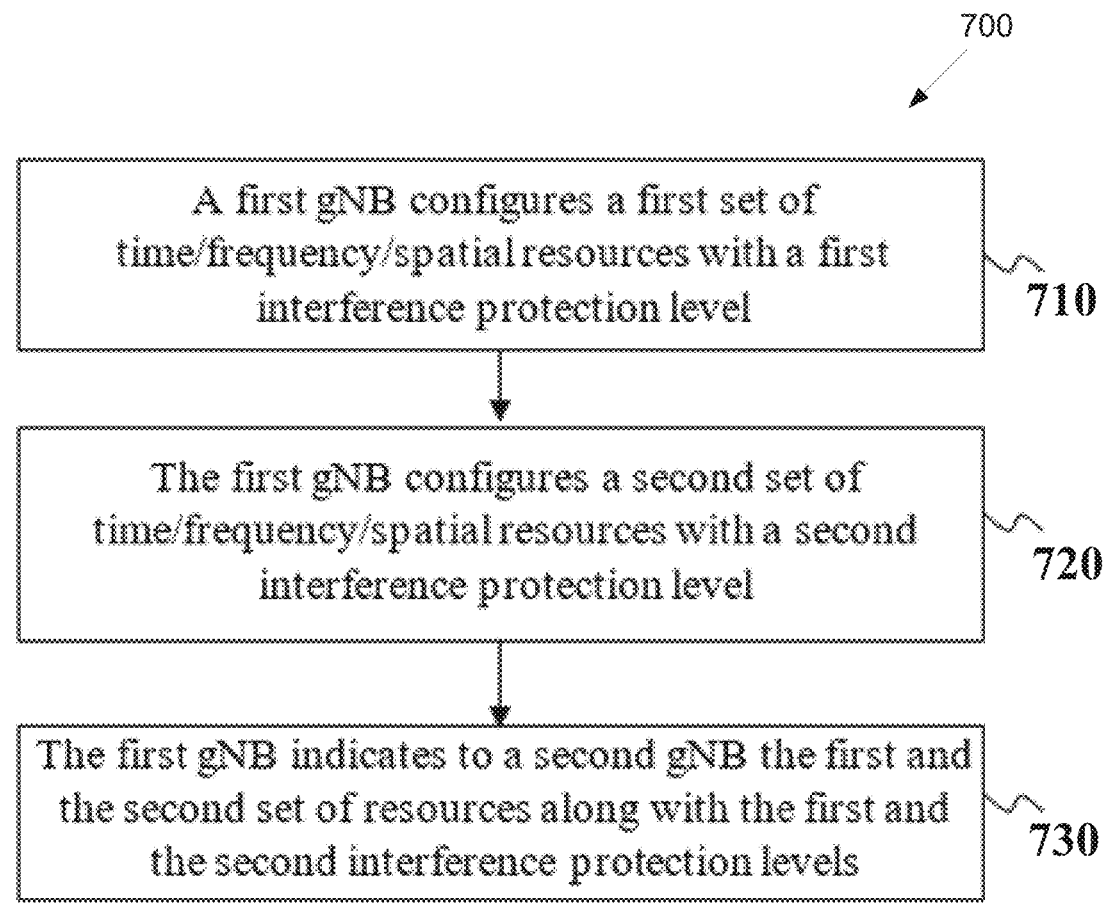
FIG. 7 illustrates a flowchart of a method for a configuration of multiple sets of time/frequency/spatial resources according to embodiments of the present disclosure.

FIG. 7 illustrates a flowchart of a method 700 for a configuration of multiple sets of time/frequency/spatial resources according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted function. In particular, FIG. 7 shows a method 700 for configuration of multiple sets of time/frequency/spatial resources corresponding to multiple interference protection levels by a first gNB such as an aggressor gNB, and indication thereof to a second gNB such as a victim gNB.

A first gNB configures a first set of time/frequency/spatial resources corresponding to a first cell operated by the first gNB with a first interference protection level, 710, and a second set of time/frequency/spatial resources corresponding to the first cell operated by the first gNB with a second interference protection level, 720.

For example, a time resource can be per millisecond or per slot, or per sub-slot with a configured sub-slot length/duration, or per symbol for a reference SCS configuration. For example, a frequency resource can be per MHz or per RB or per RBG or per BWP or per subcarrier/subcarrier-group for a reference SCS configuration. For example, a spatial resource can be per SSB. The first and second protection levels can be based on the amount of gNB activity within those resources, such as presence or absence of a transmission and/or likelihood thereof, transmission power level, and so on. Then, the first gNB indicates to a second gNB the first set and the second set of resources along with the first and second interference protection levels, 730.

Figure 8:
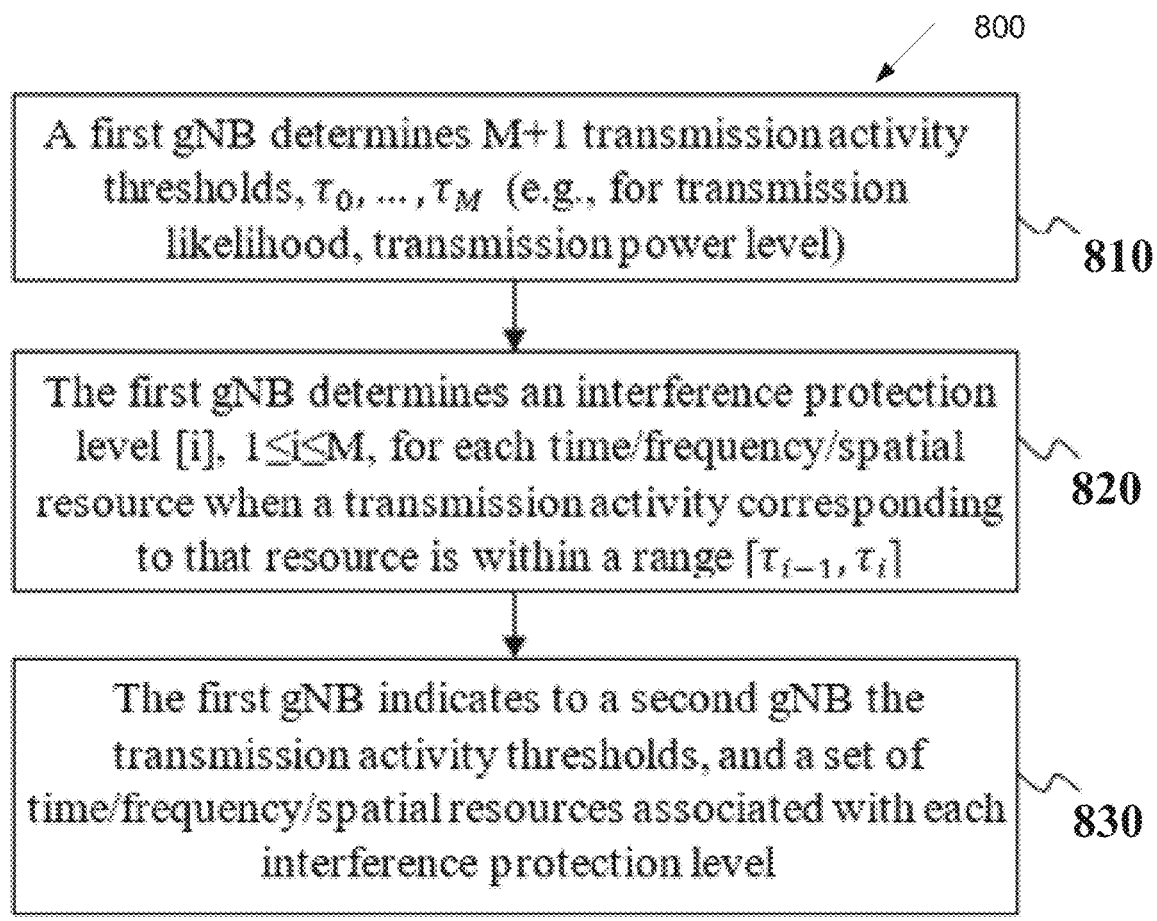
FIG. 8 illustrates a flowchart of a method for a determination of interference protection levels for time/frequency/spatial resources according to embodiments of the present disclosure.

FIG. 8 illustrates a flowchart of a method 800 for a determination of interference protection levels for time/frequency/spatial resources based on transmission activity levels by a first gNB, and indication thereof to a second gNB such as a victim gNB according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, a first gNB determines M+1 transmission activity thresholds, $\tau_0, \ldots, \tau_M$, 810. For example, a transmission activity threshold can be a transmission likelihood threshold, or transmission power threshold, and so on. In one example, when a transmission activity such as transmission likelihood or transmission power level corresponds to a (coarse/wide) allocation that includes multiple time/frequency/spatial resource units, wherein a transmission can be scheduled or configured in only a subset of those units, then a transmission activity can correspond to a maximum or minimum or average or weighted average or other function or combination of transmission activities across all resource units, or across only resource units with an actual scheduled or configured transmission.

The first gNB determines an interference protection level i, $1 \leq i \leq M$, for each time/frequency/spatial resource when a transmission activity in that resource is within a range $[\tau_{i-1}, \tau_i]$, 820. In one example, transmission activity threshold and corresponding interference protection levels can depend on different key performance indicators (KPIs), such as service types, e.g., eMBB vs. URLLC, or UE density, e.g., umber of (active) UEs, or latency/throughput requirements, and so on. Finally, the first gNB indicates to a second gNB the transmission activity thresholds, and a set of resources associated with each interference protection level, 830.

In one example of E-1-1, a coordination between aggressor and victim gNBs about inter-cell interference occurrence levels along with priority levels is provided.

In one embodiment, when two (neighbor) cells operate in a same frequency band, a second gNB such as a victim gNB can indicate to a first gNB such as an aggressor gNB about inter-cell interference levels experienced in time/frequency/spatial resources possibly along with a priority level to indicate how critical/important a resource is for the second gNB operation such as for scheduling/configuring critical services. For example, the second gNB may want to use a certain BWP for URLLC services.

According to this embodiment, such an indication can additionally include or indicate a preferred set of resources with a preferred interference protection level (as discussed in the aforementioned embodiment E-1) from the second/victim gNB perspective and requested from the first/aggressor gNB. It is noted that the first gNB may or may not take such preference and request into account, and any action is up to the first gNB. However, an indication of priority levels can help the first/aggressor cell or gNB to better realize the interference situation from the second/victim gNB perspective, and e.g., in case of partially accommodating the request from the second/victim gNB, to better decided which resources are more important/critical to be protected, e.g., in terms of reducing transmission activity level (e.g., transmission likelihood/density/power level) on those resource. Such an indication can be reported as an Xn message or information elements between the two gNBs (or as an F1 message/IE between different parts of a split gNB, e.g., for the case of inter-TRP interference coordination).

Since the network needs to handle a diverse set of KPIs, the impact of interference management/protection is not uniform for all situations, e.g., different interference levels can have different impact for different channels, services, and so on.

For example, an interference level can be based on, e.g., a reception power level in a time/frequency/spatial resource, wherein a resource granularity can be in various units as discussed in the aforementioned embodiment E-1. In one example, an inter-cell interference level experienced in a time/frequency/spatial resource can be based on a received signal quality such as L1-filtered and/or L3-filtered RSRP, or reference signal received quality (RSRQ), or received signal strength indicator (RSSI), or SINR, and so on. In one example, an interference level is based on a received power level such as energy per resource element (EPRE) of a transmission(s) in the resource. In one example, an interference level is based on maximum/minimum/average/weighted average and/or other functions or combinations thereof corresponding to received signal quality/EPRE/RSRP/SINR and so on across different sub-carriers and/or symbols of a resource.

For example, an indication for an interference level can include attributes such as one or more of: "high interference," "medium interference," "low interference," and so on, or can include a numerical metric such as an N-bit string, e.g., with N=1, 2, 3 bits wherein each value of the bit string maps to a predefined interference level, e.g., an all-zero string can correspond to a lowest interference level and an all-one string can correspond to a highest interference level, or using a range such as a percentage/metric in the range [0, . . . , 100] wherein a value 0 can indicate, e.g., lowest interference level while a value 100 can indicate, e.g., highest interference level.

For example, a priority level of a time/frequency/spatial resource can be based on e.g., a physical-layer priority such as whether the second gNB needs the resource for a dynamically scheduled vs. configured transmission, a UE-specific vs. cell-specific transmission, a data vs. control vs. reference signal transmission, a periodic vs. semi-persistent vs. aperiodic transmission (e.g., a resource associated with a cell-specific transmission has higher priority compared to a resource associated with a UE-specific transmission, or e.g., a resource associated with a control/PDCCH/PUCCH transmission has higher priority compared to a resource associated with a data/PUSCH/PDSCH transmission or a reference signal/CSI-RS/SRS transmission), and so on, or can be based on a service priority, e.g., whether the second/victim gNB needs the resource for eMBB or URLLC service (e.g., a resource associated with a URLLC transmission has higher priority compared to a resource associated with an eMBB transmission), or can be based on a network hierarchy, e.g., whether the second gNB is a public network (PN) such as a PLMN or the second gNB is a private/NPN, or a CAG or a CSG, or can be based on different KPIs, such as a UE density, e.g., number of (active) UEs associated with the resource, e.g., when the resource is shared for transmission/reception by multiple UEs, or latency/throughput requirements associated with transmissions/receptions (potentially) scheduled or configured on the resource, and so on.

For example, a priority level indication can include attributes such as one or more of: "high priority," "medium priority," "low priority," and so on, or can include a numerical metric such as an N-bit string, e.g., with N=1, 2, 3 bits wherein each value of the bit string maps to a predefined priory level, e.g., an all-zero string can correspond to lowest priority level (e.g., indicating no/little request for interference protection by the first/aggressor gNB) and an all-one string can correspond to highest priority level (e.g., indicating strong request for interference protection to be provided by the first/aggressor gNB), or using a range such as a percentage or a benefit metric in the range [0, . . . , 100] wherein a value 0 can indicate, e.g., lowest priority, while a value 100 can indicate, e.g., highest priority.

In one example, a determination of a priority level is based on a predetermined and/or configured rule or formula in the system operation specifications, while in another example, part or all elements of such determination is left to gNB implementation. In one example, some parameters used for determination of an interference level and/or priority level can be reported/indicated in a corresponding Xn interface message, e.g., as part of assistance information for the Xn message.

In one example, an interference level and a priority level corresponding to a time/frequency/spatial resource can be jointly coded into a same parameter/field, instead of two separate parameters/fields.

Figure 9:
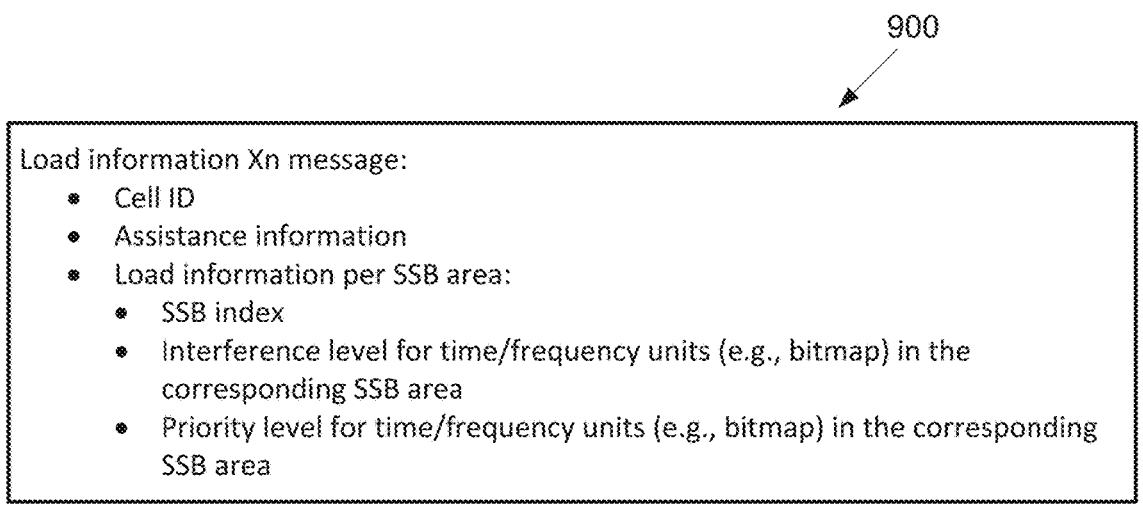
FIG. 9 illustrates an example Xn message/IE for inter-gNB coordination regarding interference or load information for time/frequency/spatial resources according to embodiments of the present disclosure.

FIG. 9 illustrates an example Xn message/IE for inter-gNB coordination 900 regarding interference or load information for time/frequency/spatial resources according to embodiments of the present disclosure. Such a load information IE can be transmitted by a second gNB such as a victim gNB to a first gNB such as an aggressor gNB. An embodiment of the Xn message/IE for inter-gNB coordination 900 shown in FIG. 9 is for illustration only.

In one example, the load information IE can include a cell ID, such as a physical cell ID (PCI) and/or a CGI and so on, e.g., corresponding to the second/victim gNB. The information element can additionally include assistance information for the IE, such as threshold values, e.g., EPRE, RSRP or SINR threshold values and so on, used for determination of different interference levels experienced in resources associated with the second/victim gNB.

The assistance information can additionally include the units used to indicate time/frequency/spatial resources, e.g., in terms of symbols/sub-slots/slots and/or in terms of SC/RB/RBG/BWP, and so on. The main entry of the information element can include experienced interference/load information, which can be, e.g., per SSB or SSB area in case there is more than one SSB (in a SSB burst set) corresponding to the cell. Herein, a load information can include, e.g., information regarding an experienced inter-cell interference level from among a set of predetermined/preconfigured inter-cell interference levels corresponding to a list of time domain and/or frequency domain resources (corresponding to a given SSB index and/or within a given SSB area), wherein the list can be based on indication of time/frequency units such as by using a bitmap or an percentage string as discussed previously, or an explicit list can be indicated in terms of time unit(s) and/or frequency unit(s). If the load information is per SSB or SSB area, then an SSB index (e.g., in the range 0 to 63) can be also included along with the corresponding load information such as the bitmap. In one example, if a certain SSB index is not included in the actually transmitted SSB(s) within an SSB burst set, the load information can be excluded for that SSB index.

In one example, an inter-cell interference level included in the load information IE can be based on direct gNB measurements and/or UE-assisted/UE-based measurements, possibly during measurement gaps configured to a UE or a group of UEs in the second/victim cell.

In on example, a spatial domain indication of load/interference level and/or priority level for time/frequency resources can be based on SSB beams of the second/victim cell or gNB or based on predetermined or (pre-)configured directional/spatial/angular slices, as described in the aforementioned embodiment E-1 for the case of interference protection level indication by the first/aggressor gNB.

Also, in another example, usage of a time/frequency domain window for reporting (e.g., over the Xn interface and/or the F1 interface) of interference levels and/or priority levels corresponding to time/frequency/spatial domain resources can be applied as described in the aforementioned embodiment E-1 for the case of interference protection level indication by the first/aggressor gNB.

In one example, when the first/aggressor gNB and the second/victim gNB operate with different numerologies, such as a different SCS or a different normal/extended cyclic prefix, then an Xn message can include an indication of the corresponding numerology, so that the gNB that receives the Xn message can correctly interpret the time durations and the frequency bandwidths, e.g., one slot with SCS=15 kHz overlaps two slots with SCS=30 kHz. Alternatively, a reference SCS configuration or absolute time/frequency units can be used.

In another example, when one or both gNBs have different numerologies across different parts of their frequency spectrum, e.g., a first set of RBs with a first numerology and a second set of RBs with a second numerology, an Xn message can include an indication of each frequency part, e.g., an indication of RB indices, along with the corresponding numerology. According to this example, if a gNB can operate with two different numerologies on a same RB or on a same set of RBs, e.g., using two different antenna panels/sub-arrays/TRPs, and so on, an Xn message can include an indication of each frequency part, e.g., an indication of RB indices, along with the two corresponding numerologies, possibly along with an indication of spatial/directional/angular/beam/SSB information associated with each of the two numerologies.

In one example, a load information can indicate a (maximum/average) level of inter-cell interference that is preferred or expected, instead of an inter-cell interference level that is already being experienced, for the corresponding time/frequency/spatial resource.

TABLE 3A and TABLE 3B provide example Xn interface messages for inclusion in [TS 38.423] that implement details of the structure provided in FIG. 9. The two tables include similar information, except that TABLE 3A considers spatial domain coordination of gNBs by reporting per SSB information protection levels (including SSB indices), while TABLE 3B excludes such spatial/beam/SSB information. Similar messages can be considered for the F1 interface for inclusion in [TS 38.473], e.g., for the case of inter-TRP interference coordination.

TABLE 3A

| IE/Group Name | Presence | Range | IE type and reference | Semantics description |
|---|---|---|---|---|
| NR CGI | | | 9.2.2.7 | |
| NR PCI | | | INTEGER (0 . . . 1007, . . .) | |

TABLE 3A-continued

| IE/Group Name | Presence | Range | IE type and reference | Semantics description |
|---|---|---|---|---|
| Interference level assistance information List | | 1 | | |
| >Periodicity of the report | | | ENUMERATED (sl5, sl10, sl20, sl40, sl80, sl160, sl320, sl640, . . .) | The length of the time window over which interference/priority levels are reported. Values "sl5" represents 5 slots, "sl10, represents 10 slots, and so on, in the numerology of the serving cell. Can additionally include a starting SFN. Can additionally include a frequency-domain window for the report. |
| >Time domain resource unit | O | | ENUMERATED (sym1, sym2, sym3, sym4, sym7, slot, . . .) | Granularity of resources in the time domain, "sym1" refers to 1 symbol, "sym2" refers to 2 symbols, and so on. "slot" refers to resource granularity being one slot. If this IE is absent, a unit of slot is considered. |
| >Frequency domain resource unit | O | | ENUMERATED (SC, RB, RBG, BWP, . . .) | Granularity of resources in the frequency domain. "SC" refers to one subcarrier, "RB" refers to a resource block, "RBG" refers to resource block group, "BWP" refers to a bandwidth part. If this IE is absent, interference/priority level applies to the entire frequency span of the carrier associated with the cell. Can additionally include a numerology/subcarrier spacing for the reported frequency allocation. |
| >Thresholds for interference level determination | O | | ENUMERATED {0, 0p01, . . . , 0p99, 1} SIZE (2^N_levels + 1) Or ENUMERATED {0, 0p01, . . . , 0p99, 1} SIZE (101) | Threshold values that are used to determine the interference levels/(e.g., thresholds for RSRP, SINR, EPRE). Value "0p01" represents 0.01, "0p99" represents 0.99, and so on. The number of thresholds is based on whether a bitmap or an integer string is used for indication of interference levels. |
| SSB area iinterference and priority level information list | | 1 | | |
| >SSB interference protection information item | | 1 . . . <maxnoofSSBAreas> | | |
| >>SSB index | M | | INTEGER (0 . . . 63) | |
| >>SSB area interference level of resources | M | | BIT STRING (SIZE (N_t × N_f × N_levels, . . .)) or INTEGER STRING | Bitmap or integer string for indication of interference levels per time/frequency unit. [N_t] and [N_f] refer to |

TABLE 3A-continued

| IE/Group Name | Presence | Range | IE type and reference | Semantics description |
|---|---|---|---|---|
| | | | {(0 ... 100)}SIZE (N_t × N_f, ...)) | the number of time-domain units and the number of frequency-domain units, respectively, within the reporting window for Interference and priority level information. For bitmap indication, [N_levels] refers to the number of bits to indicate different interference levels, e.g., an all-zero bit-string can correspond to no interference, and an all-one bit-string can correspond to high interference. For integer string indication, a value 0 can indicate no interference and a value of 100 can indicate high interference. |
| >>SSB area priority level of resources | M | | BIT STRING (SIZE (N_t × N_f × N_priority, ...)) or INTEGER STRING {(0 ... 100)}SIZE (N_t × N_f, ...)) | Bitmap or integer string for indication of priority level per time/frequency unit. [N_t] and [N_f] refer to the number of time-domain units and the number of frequency-domain units, respectively, within the reporting window for Interference and priority level information. For bitmap indication, [N_priority] refers to the number of bits to indicate different priority levels, e.g., an all-zero bit-string can correspond to no priority, and an all-one bit-string can correspond to high priority. For integer string indication, a value 0 can indicate no priority and a value of 100 can indicate high priority. |

TABLE 3B

| IE/Group Name | Presence | Range | IE type and reference | Semantics description |
|---|---|---|---|---|
| NR CGI | | | 9.2.2.7 | |
| NR PCI | | | INTEGER (0 ... 1007, ...) | |
| Interference level assistance information List | | 1 | | |
| >Periodicity of the report | | | ENUMERATED (sl5, sl10, sl20, sl40, sl80, sl160, sl320, sl640, ...) | The length of the time window over which interference/priority levels are reported. Values "sl5" represents 5 slots, "sl10, represents 10 slots, and |

TABLE 3B-continued

| IE/Group Name | Presence | Range | IE type and reference | Semantics description |
|---|---|---|---|---|
| | | | | so on, in the numerology of the serving cell. Can additionally include a starting SFN. Can additionally include a frequency-domain window for the report. |
| >Time domain resource unit | O | | ENUMERATED (sym1, sym2, sym3, sym4, sym7, slot, . . .) Or ENUMERATED (sliv1, sliv2, sliv3, sliv4, . . . , sliv[N] . . .) | Granularity of resources in the time domain, "sym1" refers to 1 symbols, "sym2" refers to 2 symbols, and so on. "slot" refers to resource granularity being one slot. "sliv1" refers to a group of symbols with SLIV = 1, "sliv2" refers to a group of symbols with SLIV = 2, and so on. If this IE is absent, a unit of slot is considered. |
| >Frequency domain resource unit | O | | ENUMERATED (SC, RB, RBG, BWP, . . .) | Granularity of resources in the frequency domain. "SC" refers to one subcarrier, "RB" refers to a resource block, "RBG" refers to resource block group, "BWP" refers to a bandwidth part. If this IE is absent, interference/priority level applies to the entire frequency span of the carrier associated with the cell. Can additionally include a numerology/subcarrier spacing for the reported frequency allocation. |
| >Thresholds for interference level determination | O | | ENUMERATED {0, 0p01, . . . , 0p99, 1} SIZE (2^N_levels + 1) Or ENUMERATED {0, 0p01, . . . , 0p99, 1} SIZE (101) | Threshold values that are used to determine the interference levels/(e.g., thresholds for RSRP, SINR, EPRE). Value "0p01" represents 0.01, "0p99" represents 0.99, and so on. The number of thresholds is based on whether a bitmap or an integer string is used for indication of interference levels. |
| Interference protection information list | | 1 | | The protected resource pattern is continuously repeated, and it is valid until stated otherwise or until replaced by a new pattern. |
| > interference protection level | M | | BIT STRING (SIZE (N_t × N_f × N_priority, . . .)) or INTEGER STRING {(0 . . . 100)}SIZE (N_t × N_f, . . .)) | Bitmap or integer string for indication of priority level per time/frequency unit. [N_t] and [N_f] refer to the number of time-domain units and the number of frequency-domain units, respectively, within the reporting window for Interference and |

TABLE 3B-continued

| IE/Group Name | Presence | Range | IE type and reference | Semantics description |
|---|---|---|---|---|
| | | | | priority level information. For bitmap indication, [N_priority] refers to the number of bits to indicate different priority levels, e.g., an all-zero bit-string can correspond to no priority, and an all-one bit-string can correspond to high priority. For integer string indication, a value 0 can indicate no priority and a value of 100 can indicate high priority. |

Figure 10:
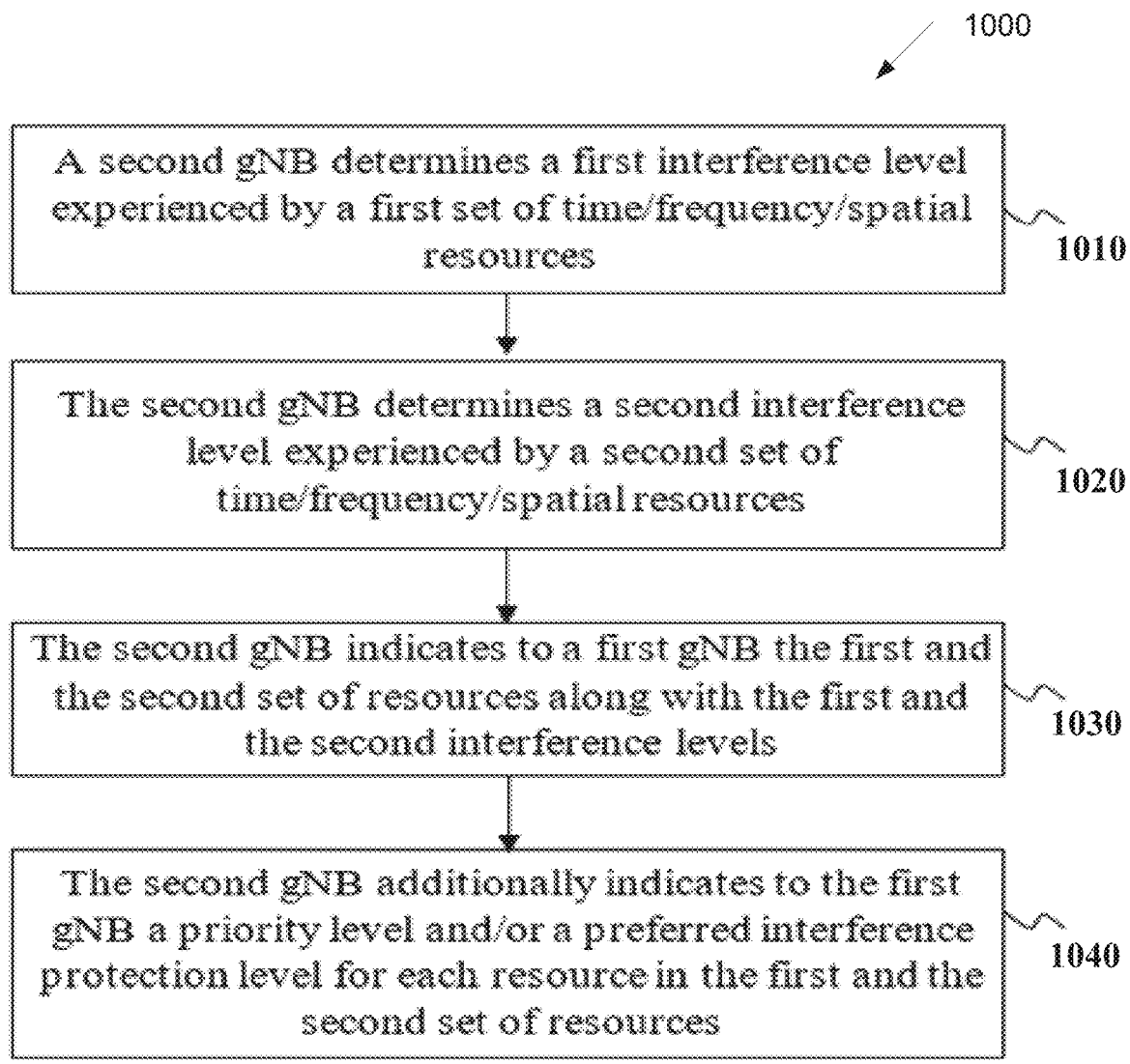
FIG. 10 illustrates a flowchart of a method for exchange of load/interference information between two gNBs according to embodiments of the present disclosure.

FIG. 10 illustrates a flowchart of a method 1000 for exchange of load/interference information between two gNBs according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIG. 10 shows an example flowchart for exchange of load/interference information between two gNBs along with an indication of a priority level and/or a preferred interference protection level for the time/frequency/spatial resources. One or more of the components illustrated in FIG. 10 can be implemented in specialized circuitry configured to perform the noted functions or one or more of the components can be implemented by one or more processors executing instructions to perform the noted functions.

A second/victim gNB determines interference levels for each of time/frequency/spatial resources and determines a first interference level experienced by a first set of time/frequency/spatial resources, 1010, and a second interference level experienced by a second set of time/frequency/spatial resources, 1020. Accordingly, the second gNB indicates to a first/aggressor gNB a load information such as interference level experienced by time/frequency/spatial resources, such as the first and the second set of resources along with the first and the second interference levels, 1030.

In one example, the second gNB can also indicate to a first gNB about the metric and/or the threshold(s) used to determine the interference levels. The second gNB additionally indicates to the first gNB a priority level and/or a preferred interference protection level for each resource in the first and the second set of resources, 1040.

In one embodiment of E-2, coordination between aggressor and victim gNBs about inter-cell interference by providing assistance information of interfering transmissions is provided.

In one embodiment, when two (neighboring) cells operate in a same frequency band, a first/aggressor gNB can indicate to a second/victim gNB what transmissions are causing interference in a set of time/frequency/spatial resources with a certain interference protection level, and possibly additionally provide assistance information about the configuration of those interfering transmissions. The second/victim gNB can consider such information by appropriate scheduling or configuration of transmissions, e.g., in symbols/sub-slots/slots and/or in SCs/RBs/RBGs/BWPs not overlapping with the interfering transmissions or by providing the assistance information to UEs that can cancel an interference caused by one or some such interfering transmissions.

Such an indication can be reported as an Xn message or information elements between the two gNBs (or as an F1 message/information element (IE) between different parts of a split gNB, e.g., for the case of inter-TRP interference coordination).

For example, an interfering transmission can include a configured transmission or a transmission scheduled via a DCI format by the first/aggressor gNB. In one example, an interfering transmission can include cell-specific transmissions e.g., SSB or SIB or paging transmissions that are fully or partially configured transmissions, or UE-specific (configured) transmissions using resources can be possibly shared among multiple UEs, e.g., periodic or semi-persistent CSI-RS, SPS PDSCH transmissions, CG-PUSCH transmissions, periodic or semi-persistent SRS, and so on.

For example, a set of time/frequency/spatial resources that are indicated by the first gNB to the second gNB to have, e.g., "high" inter-cell interference protection level or otherwise indicated as "RAS" or "RAA" can still overlap with some interfering transmissions in the first cell, such as those described above. Such an overlap can occur, e.g., when interfering transmissions are periodic with short periodicity, so that restricting resources with "high" inter-cell interference protection level to resources that are interference-free is not feasible or desirable.

In addition, providing an indication about overlap of interfering transmissions by the first/aggressor gNB with "reduced activity" or "high protection" time/frequency/spatial resources, as well as providing assistance information for such interfering transmissions, can be beneficial, e.g., for cases where "reduced activity" or "high protection" resources are not configured in fine-resolution units of resource allocation, such as symbols, rather in coarser units such as slots, possibly with little/no information or restriction on the corresponding frequency domain allocation of such "reduced activity" or "high protection" resources. Therefore, a basic indication such as information of an interference protection level or a reduced activity indication may not provide sufficient information to the second/victim gNB about whether the resource is fully interference-free or if there is still a possibility for some interference at least in some parts (e.g., some symbols) of those resources.

Accordingly, an indication about whether there is an overlap between such "reduced activity" or "high protection" resources and some interfering transmissions can be very beneficial. In particular, for the case that interfering transmissions are (cell-specific) configured transmissions, as opposed to transmissions scheduled by DCI formats, assistance information regarding configuration information of such configured interfering transmissions along with possible structures and patterns mandated by system operation specifications (e.g., structure and allowed locations for SSB transmission in a half-frame, or formulas for paging occasions determination, and so on) can provide the second/victim gNB with further/sufficient information to make a better/clearer determination of the interfering transmissions, and use the further/sufficient information for interference-aware scheduling and/or possibly providing assistance for UE-based interference cancelation.

In one example, assistance information from the first/aggressor gNB to the second/victim gNB can include a list of time/frequency/spatial resource allocations for SSBs on a cell, when multiple SSBs are transmitted within the frequency span of a carrier and are linked to a unique CGI and therefore a unique PCI. This can include zero or one CD-SSB that is associated with a remaining minimum system information (RMSI), also known as SIB1, as well as zero, one, or multiple non-CD-SSB(s), that are not associated with an RMSI/SIB1.

For each such SSB, assistance information includes frequency domain information such as a corresponding ARFCN value, time domain information such as a periodicity, an offset e.g., subframe offset, and/or a duration, and/or spatial domain information such as a bitmap to indicate an SSB pattern (within an SSB burst set) using, e.g., SSB-ToMeasure or ssb-PositionsInBurst, and possibly also directional/angular information of SSB transmissions, e.g., spatial transmission filters or beam for the SSB(s).

In one example, assistance information from the first/aggressor gNB to the second/victim gNB can include a full configuration, such as a full time/frequency domain resource configuration, of some/all transmissions that overlap with RAS/RAR or simply with some/all resources configured and indicated as having a certain interference protection level such as "high" inter-cell interference protection level.

In another example, a partial configuration of such transmission can be provided such as only slots or RBs that overlap with the RAS/RAR/protected resources, but not the full time/frequency domain configuration. In yet another example, assistance information can include a super-set of time/frequency/spatial resources where an interfering transmission can be allocated, but precise information of the actual time/frequency/spatial resources for the interfering transmission may not be indicated.

Figure 11:
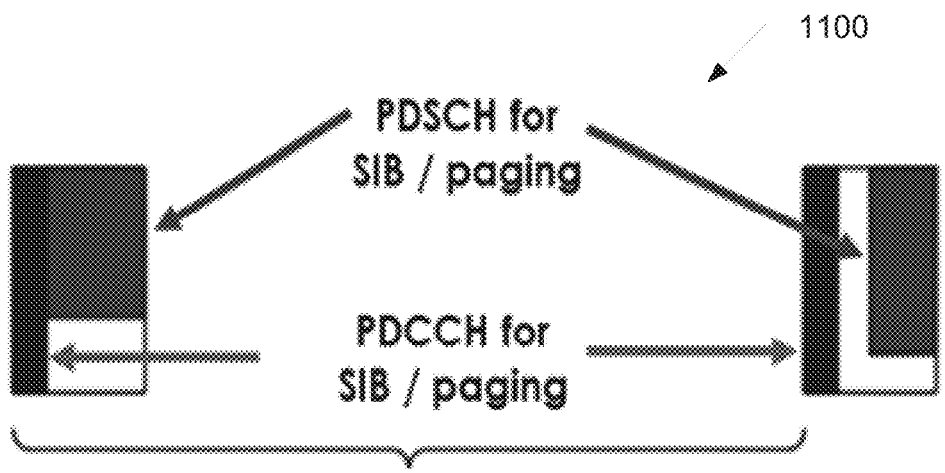
FIG. 11 illustrates an example PDSCH and PDCCH transmissions according to embodiments of the present disclosure.

FIG. 11 illustrates an example PDSCH and PDCCH transmissions 1100 according to embodiments of the present disclosure. An embodiment of the PDSCH and PDCCH transmissions 1100 shown in FIG. 11 is for illustration only.

For example, for a SIB or paging transmission, the first/aggressor gNB can indicate a slot (along with a periodicity) and/or a set of RBs such as a frequency-domain allocation of CORESET #0, wherein a SIB or paging transmission can be scheduled by a DCI format in some symbol(s) of the slot and/or some RBs in the set of indicated RBs, but the exact allocation by the scheduling DCI, as illustrated in FIG. 11, may not be exchanged between the two gNBs.

In another example, other configuration information such as periodicity and/or slot offset can be indicated by the first/aggressor gNB to the second/victim gNB. Herein, a SIB can, e.g., refer to SIB1 and at least all SIB-x>1 that are broadcast/cell-specific. In a further example, assistance information can include one or more of a cell ID, such as a physical/global cell ID, a frequency information such a band number, a seed or an initialization value for a (pseudo-) random number generator for a sequence generation, a number of antenna ports for a transmission, and so on. In yet another example, assistance information can include a bit sequence value(s) and/or information contents of a transmission, such as a bit sequence information content embedded in/carried by a MIB, PBCH, SIB, paging, and so on.

As illustrated in FIG. 11, PDSCH and PDCCH transmissions for SIB and/or paging are scheduled. The transmissions are periodic with a periodicity of X msec, and wherein a UE receives the PDCCH in a UE-common CORESET such as CORESET #0 and the PDSCH resources are scheduled by a DCI format provided by the PDCCH within a same slot as the PDCCH and within a subset of frequency allocation of CORESET #0.

TABLE 4

| IE/Group Name | Presence | Range | IE type and reference | Semantics description | Criticality | Assigned Criticality |
|---|---|---|---|---|---|---|
| Served cell information NR (Revised) | | | | | | |
| NR-PCI | M | | INTEGER (0 ... 1007, ...) | NR Physical Cell ID | — | |
| NR CGI | M | | 9.2.2.7 | | — | |
| <Other IEs omitted> | | | | | | |
| NR Cell PRACH configuration | O | | OCTET STRING | Containing 9.3.1.139 NR Cell PRACH Configuration as of TS 38.473. | YES | ignore |
| CSI-RS transmission indication | O | | ENUMERATED {activated, deactivated, ...} | This IE indicates the CSI-RS transmission status of the given cell. | YES | ignore |
| SSB Info list | | 0 ... <maxnoofSSBsPerCell> | | This IE indicates a list of configuration information for SSBs when multiple SSBs | | |

TABLE 4-continued

Served cell information NR (Revised)

| | | | | | |
|---|---|---|---|---|---|
| | | | are configured on the cell (from gNB perspective). This can include zero or one cell-defining SSB (CD-SSB) and zero, one, or multiple non-CD-SSB(s), as defined in TS 38.300. | | |
| >SSB info | M | OCTET STRING | Contains the MeasurementTiming Configuration inter-node message for the served cell, as defined in TS 38.331. | | — |
| >SSB positions in burst | O | 9.2.2.64 | | YES | ignore |
| NR cell SIB1/Common PDCCH configuration | O | OCTET STRING | Contains the PDCCH-ConfigSIB1 IE and/or PDCCH-ConfigCommon IE for configuration of cell specific PDCCH parameters, as defined in TS 38.331 | YES | ignore |
| NR cell SIB scheduling configuration | O | OCTET STRING | Contains the SI-SchedulingInfo IE needed for acquisition of SI messages, as defined in TS 38.331 | YES | ignore |
| NR cell paging configuration | O | OCTET STRING | Contains the PCCH-Config IE for configuration information of paging, as defined in TS 38.331 | YES | ignore |

| Range bound | Explanation |
|---|---|
| maxNoOfBPLMNs | Maximum no. of broadcast PLMNs by a cell. Value is 12. |
| maxNoOfSSBsPerCell | Maximum no. of SSBs configured on a cell (from gNB perspective). Value is [4]. |

TABLE 4 includes an example extension/revision of the "served cell information NR" Xn IE 9.2.2.11 in the Xn AP specifications TS 38.423 that contains cell configuration information of an NR cell that a neighboring NG-RAN node may need for the Xn AP interface. Herein, the red highlighted rows show example assistance information that can be provided by a first/aggressor gNB to a second/victim for inter-cell interference coordination purposes. For example, a new entry "SSB Info List" can include a list of configuration information, such as time/frequency/spatial resource allocation, of SSBs when multiple SSBs are configured on a cell within a carrier (from gNB perspective).

Multiple SSBs can include zero or one CD-SSB and zero, one, or multiple non-CD-SSB(s), as defined in TS 38.300. For example, a new entry "NR Cell SIB1/Common PDCCH Configuration" can include configuration information from [TS 38.331] that contains the PDCCH-ConfigSIB1 IE and/or PDCCH-ConfigCommon IE for configuration of cell specific PDCCH parameters, such as CORESET #0, search space set #0, paging search space, and so on. For example, a new entry "NR Cell SIB scheduling Configuration" can include configuration information from [TS 38.331] that contains the SI-SchedulingInfo IE needed for acquisition of SI messages, particularly for time-domain configuration of SIB-x>1, such as periodicity of SIB-x>1 transmissions. For example, a new entry "NR Cell Paging Configuration" can include configuration information from [TS 38.331] that contains the PCCH-Config IE for configuration information of paging, such as paging cycle, paging frames, and paging occasions.

Figure 12:
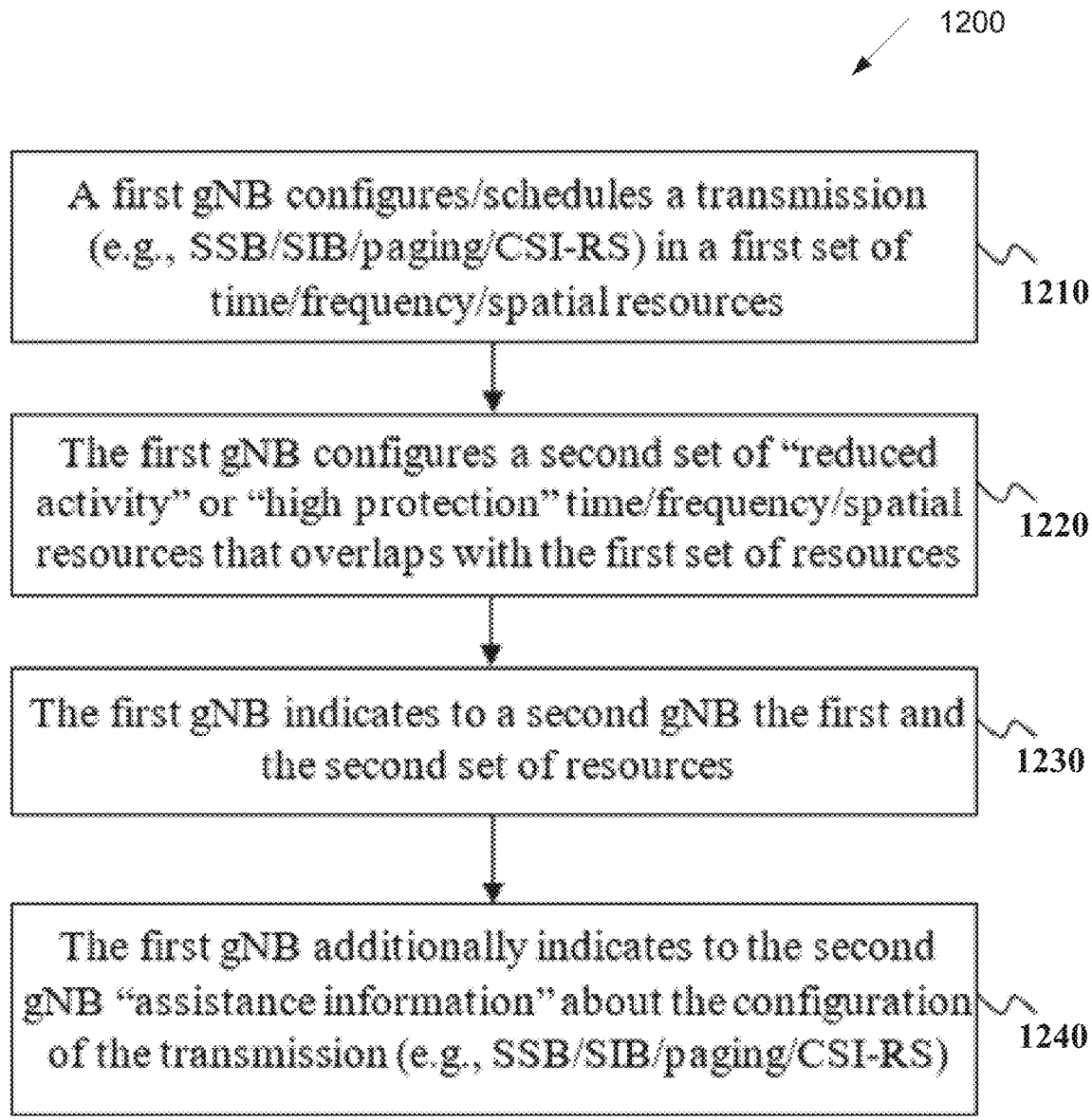
FIG. 12 illustrates a flowchart of a method for an indication by a first/aggressor gNB to a second/victim gNB according to embodiments of the present disclosure.

FIG. 12 illustrates a flowchart of a method 1200 for an indication by a first/aggressor gNB to a second/victim gNB according to embodiments of the present disclosure. For example, the indication may be about interfering transmissions and configuration/assistance information thereof that overlap with at least some parts of reduced activity resources/allocations/slots configured with high inter-cell interference protection level. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

A first gNB, such as an aggressor gNB, configures and/or schedules a transmission (e.g., SSB/SIB/paging/CSI-RS/SPS-PDSCH, and so on) in a first set of time/frequency/spatial resources, 1210. The first/aggressor gNB configures a second set of "reduced activity" or "high protection" time/frequency/spatial resources that overlaps with the first set of resources, 1220. The first/aggressor gNB indicates to a second gNB, such as a victim gNB, the first and the second set of resources, 1230.

In one example, the first/aggressor gNB indicates to the second/victim gNB the second set and only the overlap of the first set and the second set of resources, instead of a full indication of the entire first set of resources. The first/aggressor gNB additionally indicates to the second/victim gNB "assistance information" about the configuration of the transmission (e.g., SSB/SIB/paging/CSI-RS/SPS-PDSCH, and so on), 1240. For example, such assistance information can include time/frequency allocation of the transmission(s) as previously described.

In one example, an indication for overlap of interfering transmissions from the first/macro cell or gNB with the reduced activity slots/allocation or more generally with protected, e.g., "high protection" time/frequency/spatial resources, and corresponding assistance information, are provided by the first/aggressor gNB to the second/victim gNB when a periodicity of the interfering transmission is short compared to a duration of the time window for configuration and indication of reduced activity slots/protected resources, so that a significant number of occasions of the interfering transmission overlap with the reduced activity slots/protected resources.

Once a second/victim gNB receives assistance information about an interfering transmission from the first/aggressor gNB overlapping with "reduced activity" or "high protection" time/frequency/spatial resources, the second/victim gNB can provide that information via higher layer/RRC configuration to served UEs, such as cell edge UEs, so that the UEs can detect the interfering transmission, cancel it, and then detect transmissions from the second/victim gNB.

In one example, separate UE capabilities can be defined for interference cancelation corresponding to different signals or channels and/or a single UE capability may cancelation to interference cancelation corresponding to a group of multiple signals or channels. For example, separate UE capabilities can be defined for cancelation of SSB, SIB, paging, or a single UE capability can be defined for cancelation of all SSB, SIB, paging. A UE can have separate processing units for reception and decoding transmissions from the UE's serving cell and for decoding and cancelation (each) interfering transmissions(s) from other cells. In one example, a UE capability can apply to cell-specific transmissions. In another example, a UE capability can apply to configured transmissions (as opposed to transmissions scheduled by DCI formats).

Figure 13:
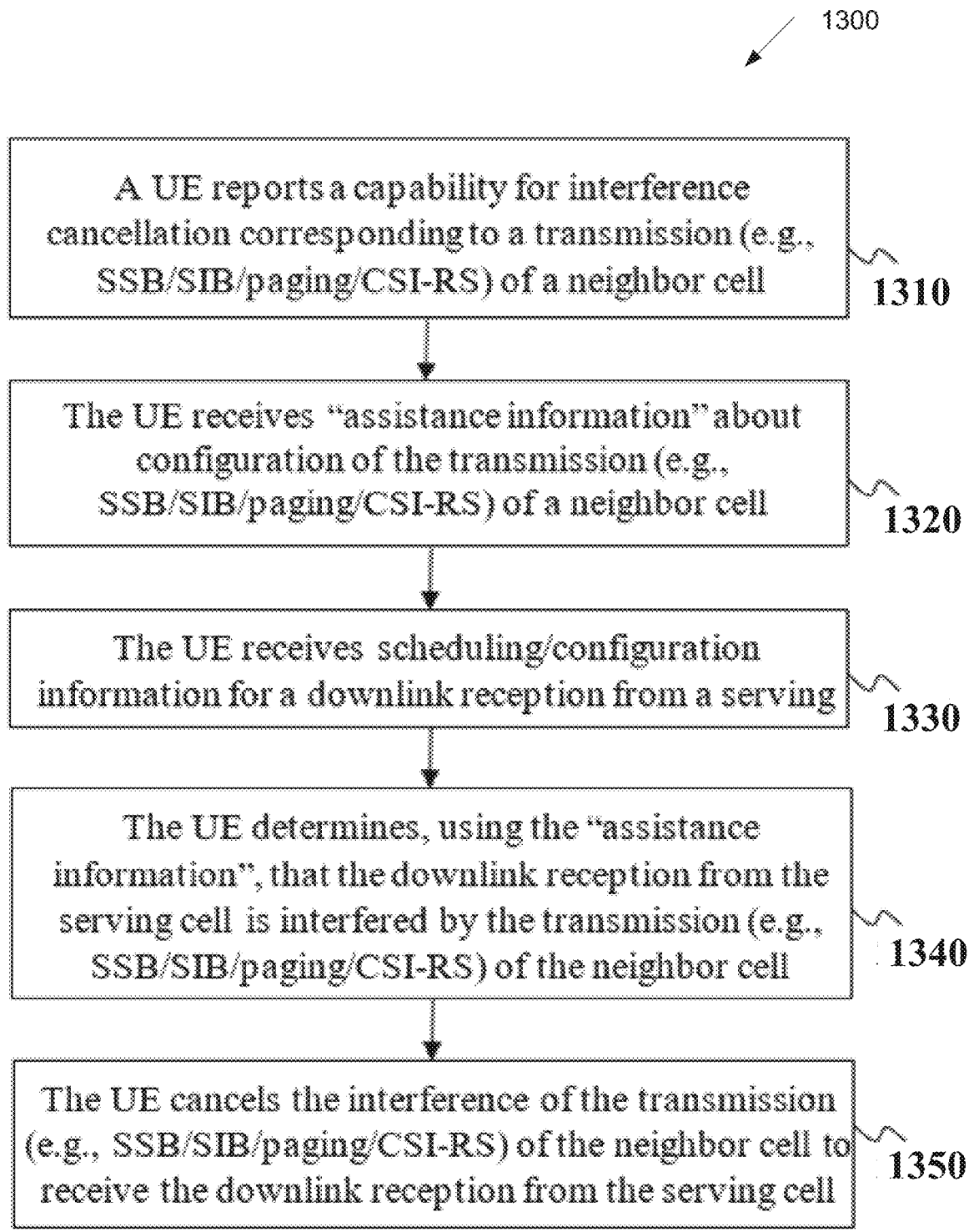
FIG. 13 illustrates a flowchart of a method for an RRC configuration of assistance information to a UE according to embodiments of the present disclosure.

FIG. 13 illustrates a flowchart of a method 1300 for an RRC configuration of assistance information to a UE according to embodiments of the present disclosure. For example, the RRC configuration is for assistance information to a UE which has reported a capability for interference cancelation. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

A UE reports a capability for interference cancelation corresponding to a transmission (e.g., SSB/SIB/paging/CSI-RS) of a neighbour cell, 1310. The UE receives "assistance information" about configuration of the transmission (e.g., SSB/SIB/paging/CSI-RS) of a neighbour cell, 1320. The UE receives scheduling/configuration information for a downlink reception from a serving cell, 1330. The UE determines, using the "assistance information," that the downlink reception from the serving cell is interfered by the transmission (e.g., SSB/SIB/paging/CSI-RS) of the neighbour cell, 1340.

The UE cancels the interference of the transmission (e.g., SSB/SIB/paging/CSI-RS) of the neighbour cell to receive the downlink reception from the serving cell, 1350.

In one embodiment of E-2-1, coordination between aggressor and victim gNBs about inter-cell interference by indicating a preferred/requested configuration for "reduced activity/high protection" resources is provided.

In one embodiment, when two (neighbor) cells operate in a same frequency band, a second gNB such as a victim gNB can indicate to a first gNB such as an aggressor gNB about a preferred set of "reduced activity" or "high protection" time/frequency/spatial resources.

Such an indication can be reported as an Xn message or information elements between the two gNBs (or as an F1 message/IE between different parts of a split gNB, e.g., for the case of inter-TRP interference coordination).

For example, such a request/recommendation/indication can be based on a need by the second/victim gNB to configure all occasions or all time/frequency allocations of a configured transmission, such as a SIB, paging, periodic or semi-persistent CSI-RS, SPS PDSCH receptions, CG-PUSCH transmissions, and/or periodic or semi-persistent SRS, and so on, within the set of "reduced activity" or "high protection" resources configured by the first/aggressor gNB, so that those configured transmissions are not impacted by inter-cell interference. This can be beneficial when a density of "reduced activity" or "high protection" resources is low or when a periodicity of such configured transmission(s) in the second/victim cell is short.

The second/victim gNB can adjust or reconfigure a configured transmission to have a high/maximal overlap with the "reduced activity" or "high protection" resources, but if there are still some occasions and/or resources corresponding to a configured transmission by the second/victim gNB that cannot be fit into the "reduced activity" or "high protection" resources configured by the first/aggressor gNB, then the second/victim gNB can make a request/recommendation for adjusting/modifying the "reduced activity" or "high protection" resources so that the "left-out" occasions/resources corresponding to the configured transmission(s) can be included in the "reduced activity" or "high protection" resources.

In one example, a second/victim gNB configures a transmission (e.g., SIB/paging/CSI-RS) in a first set of time/frequency/spatial resources. The second/aggressor gNB receives a configuration from a first gNB for a second set of "reduced activity" or "high protection" time/frequency/spatial resources, that does not fully contain the first set of resources. In one example, the order of the previous two statements can be reverse, so that configuration of the first set of resources by the second/victim gNB is after (and possibly based on) the configuration of the first set of resources by the first/aggressor gNB. The second/victim gNB indicates a preferred, third set of "reduced activity" or "high protection" time/frequency/spatial resources to the first/aggressor gNB, by indicating the difference of the first set and the second set of resources.

In one example, when all occasions and/or all time/frequency allocations of a common/cell-specific configured transmission, such as a SIB, are not fully included in the set of "reduced activity" or "high protection" resources configured by the first/aggressor gNB, the second/victim gNB can transmit the contents of the common/cell-specific configured transmission, such as the SIB, using dedicated RRC configuration and the second gNB can select corresponding PDCCH/PDSCH resources to be fully included in the set of "reduced activity" or "high protection" resources. To achieve this, signaling of such a dedicated RRC message needs to be defined and supported.

In one embodiment of E-3, CSI-RS with varying transmission power to handle inter-cell interference is provided.

In one embodiment, for periodic and/or semi-persistent CSI-RS (P/SP CSI-RS), a UE can be configured two/multiple different transmission power levels and corresponding two/multiple disjoint time patterns such as two/multiple disjoint sets of slots, so that the UE receives a same CSI-RS (resource) with a first transmission power level in a first time pattern/a first set of slots, and with a second transmission power level in a second time pattern/a second set of slots, wherein the first transmission power level is different from the second transmission power level.

Figure 14:
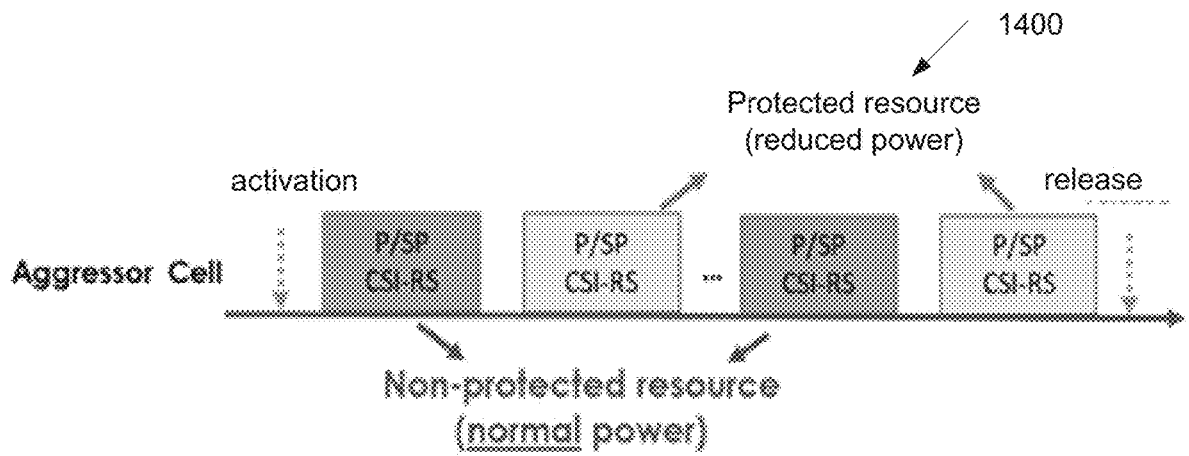
FIG. 14 illustrates an example transmission of a periodic or semi-persistent CSI-RS according to embodiments of the present disclosure.

FIG. 14 illustrates an example transmission of a periodic or semi-persistent CSI-RS 1400 according to embodiments of the present disclosure. For example, the transmission is varying transmission power level in an aggressor cell or a victim cell. Herein, an activation and release command applies to the case of SP CSI-RS, and not the periodic CSI-RS (so why the activation/release commands are shown by dashed arrows). An embodiment of the transmission of a periodic or semi-persistent CSI-RS 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

cell-edge UEs of a second/victim cell during/within the reduced activity or protected slots/resources, but that the P/SP CSI-RS is still transmitted (and not completely blanked out) during RAS or protected resource, although with a reduced/lower power, so that CSI measurement opportunities are not missed for UEs such as cell-edge UEs of the first/aggressor cell, particularly when a semi-persistent CSI reporting (SP-CSI reporting) with a short/moderate short reporting window is configured for the P/SP CSI-RS resource, or when the UE has a moderate/high speed, in order to avoid a degradation of CSI report accuracy and the corresponding link adaptation, beam management, and so on.

In one example, a time pattern or a set of slots can be periodic with a configurable periodicity and/or slot offset. In another example, a time pattern or a set of slots can be irregular or arbitrary, wherein a bitmap with a predetermined/configurable length is used to indicate which slots/resources are included or excluded in the pattern.

The following is an example revised RRC message for configuration of CSI-RS resource wherein two or multiple (depending on the parameter "nrOfTimePatterns") transmission power levels are configured, using parameters "powerControlOffsetList" and/or "powerControlOffsetSSlist," corresponding to two or multiple time patterns that are configured in the parameter "timePattern" using a bitmap whose size can be appropriately configured e.g., based on a number of CSI-RS transmission occasions that fall within one periodicity of the RAS/protected resource allocation, such as 40 msec.

TABLE 5

| Pseudo code |
|---|
| NZP-CSI-RS-Resource ::=    SEQUENCE { |
|     nzp-CSI-RS-ResourceId        NZP-CSI-RS-ResourceId, |
|     resourceMapping              CSI-RS-ResourceMapping, |
|     powerControlOffsetList       SEQUENCE (SIZE (1..nrOfTimePatterns)) OF powerControlOffset, powerControlOffsetSSlist    SEQUENCE (SIZE (1..nrOfTimePatterns)) OF powerControlOffsetSS,    OPTIONAL, -- Need R |
|     scramblingID                 ScramblingId, |
|     periodicityAndOffset         CSI-ResourcePeriodicityAndOffset        OPTIONAL, -- Cond PeriodicOrSemiPersistent |
|     timePatternList              SEQUENCE (SIZE (1..nrOfTimePatterns)) OF timePattern OPTIONAL, -- Cond PeriodicOrSemiPersistent |
|     qcl-InfoPeriodicCSI-RS       TCI-StateId                             OPTIONAL, -- Cond Periodic |
|     ... |
| } |
|     nrOfTimePatterns        ::=    [2 or 4] |
|     timePattern             ::=    BIT STRING (SIZE ([N])) |
|     powerControlOffset      ::=    INTEGER (-8..15), |
|         powerControlOffsetSS    ::=        ENUMERATED{db-3, db0, db3, db6 } OPTIONAL, -- Need R |

As illustrated in FIG. 14, for a UE operating in a first/aggressor cell that has configured a set of reduced activity slots (RAS) or more generally a set of "high protection" time/frequency/spatial resources, the UE can be configured to receive a P/SP CSI-RS with a first transmission power level outside the set of RAS or when the P/SP CSI-RS does not overlap with the set of "high protection" time/frequency/spatial resources, while the UE can be configured to receive the same P/SP CSI-RS with a second transmission power level during the set of RAS or when the P/SP CSI-RS overlaps with the set of "high protection" time/frequency/spatial resources, wherein for example the second power level can be smaller than the first power level.

The latter is e.g., to ensure that the P/SP CSI-RS is not causing excessive inter-cell interference to UEs such as In one example, a time pattern corresponding to one of the transmission power levels of a P/SP CSI-RS is not configured. According to this example, if the UE is configured with two different transmission power levels, then the UE is explicitly configured with only a single time pattern or a single set of slots, which corresponds to the lower (or higher) transmission power level. In such a case, a second time pattern or a second set of slots corresponding to the higher (or lower) transmission power level is implicitly determined by the UE to be all transmission occasions of P/SP CSI-RS (as per original configuration of P/SP CSI-RS resource) except for those included in the explicitly configured time pattern corresponding to the lower (or higher) transmission power level.

Similarly, when the UE is configured with M transmission power levels, the UE can be configured with M−1 time patterns or M−1 sets of slots corresponding to the lowest M−1 transmission power levels (resp., highest M−1 transmission power levels), and a last time pattern or set of slots corresponding to the highest transmission power level (resp., lowest M−1 transmission power levels) is implicitly determined by the UE.

In one example, a variation in transmission power of a P/SP CSI-RS can correspond to a variation in the frequency domain only, e.g., a first transmission power in a first set of frequency resources such as RBs, and a second transmission power in a second set of frequency resources such as RBs. In another example, a variation in transmission power of a P/SP CSI-RS can correspond to a variation in both time and frequency domains.

In one example, the UE is expected to report a single/same CSI measurement report (such as rank indicator (RI), precoding matrix indicator (PMI), channel quality indicator (CQI), layer indicator (LI), and/or so on) for the P/SP CSI-RS resource across all of the two/multiple disjoint time patterns that correspond to two/multiple different transmission power levels. For example, how to handle reduced transmission power level(s) for CSI-RS when making CSI-RS measurements and/or computing CSI report, including whether/how to do averaging of RSRP, SINR and/or other measurements across different time patterns/slots, can be left to UE implementation.

For example, it can be expected that a UE considers the transmission power offset among the two/multiple disjoint time patterns when performing channel estimation and reporting CSI, so that only channel/link characteristics are reported, rather than transmission power levels. According to this example, it is up to the gNB how to choose transmission characteristics of PDSCH/PUSCH, such as transmission power level(s), link adaptation parameters such as MCS, spatial transmission filters or beams such as TCI states or QCL information, e.g., the gNB can select same or different transmission power level(s) and/or MCS(s), and/or TCI state(s)/QCL assumption(s) corresponding to the two/multiple time patterns/slots. In another example, the UE can be expected to provide separate CSI reports for each of the two/multiple disjoint time patterns that correspond to two/multiple different CSI-RS transmission power levels and the UE can be configured two/multiple CSI report settings corresponding to the two/multiple disjoint time patterns.

In one example, a configuration of two/multiple transmission levels for CSI-RS applies to UEs that report a capability for handling (e.g., for reception, measurement, reporting, and so on) of CSI-RS with varying transmission power levels.

In one example, configuration of two transmission power levels and corresponding time patterns/slots can be due to reasons other than inter-cell interference and protection of time/frequency/spatial resources, e.g., configuration of two beams/spatial transmission filters/TCI states associated with two set of slots that contain transmission occasions of a single CSI-RS resource. The aforementioned mechanisms for CSI-RS transmission power levels and CSI reporting can also apply for periodic or semi-persistent CSI-RS and for periodic or semi-persistent SRS. The above mechanisms for CSI-RS transmission power levels and CSI reporting can also apply to aperiodic CSI-RS and/or aperiodic SRS, wherein a transmission power level is determined based on the slot(s)/resource(s) over which aperiodic CSI-RS and/or aperiodic SRS is transmitted.

Figure 15:
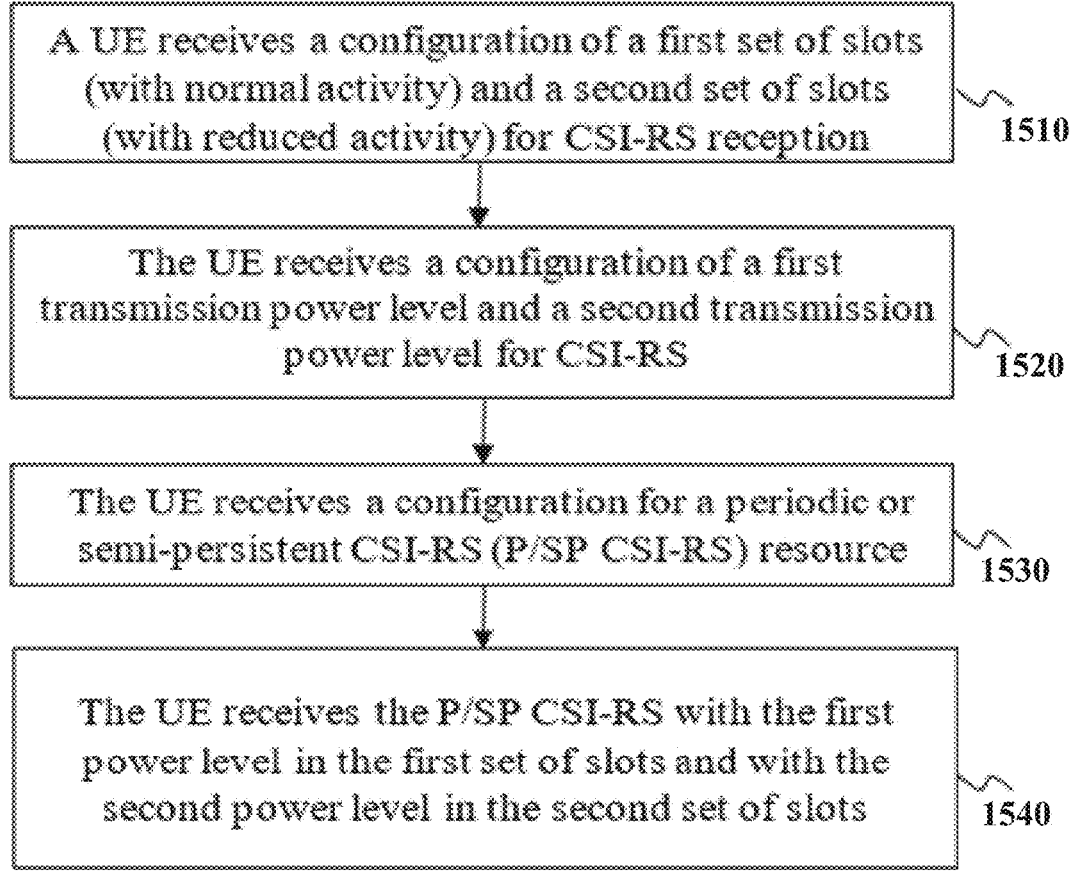
FIG. 15 illustrates a flowchart of a method for an RRC configuration of a periodic and/or semi-persistent CSI-RS resource according to embodiments of the present disclosure.

FIG. 15 illustrates a flowchart of a method 1500 for an RRC configuration of a periodic and/or semi-persistent CSI-RS resource according to embodiments of the present disclosure. For example, the RRC configuration of a periodic and/or semi-persistent CSI-RS resource has two different transmission power levels corresponding to two sets of slots, e.g., with normal activity and with reduced activity. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

A UE receives a configuration of a first set of slots (with normal activity) and a second set of slots (with reduced activity) for CSI-RS reception, 1510. In one example, the UE only receives the set of second slot with reduced activity, and implicitly determines the first set of slots with normal activity. The UE receives a configuration of a first transmission power level and a second transmission power level for CSI-RS, 1520. In one example, the two transmission power levels can apply to a single CSI-RS resource or a group of CSI-RS resources, while in another example, the configured transmission power levels can apply to all CSI-RS resources configured on that cell/BWP. The UE receives a configuration for a periodic or semi-persistent CSI-RS (P/SP CSI-RS) resource, 1530. The UE receives the P/SP CSI-RS with the first power level in the first set of slots and with the second power level in the second set of slots, 1540.

In one embodiment of E-3-1, a configuration of two/multiple sets of uplink power control parameters for CG-PUSCH is provided according to a configuration for reduced activity slots/protected resources.

In one embodiment, a UE can be configured with two/multiple sets of uplink power control parameters for a CG-PUSCH configuration, each corresponding to a set of slots/occasions/resources for CG-PUSCH transmission. The UE transmits a CG-PUSCH using a first set of power control parameters in a first set of slots/resources and a second set of power control parameters in a second set of slots/resources. Herein, for an UL BWP b of a carrier f of a serving cell c, a set of power control parameters include at least one or more of a target received power $P_{O\_PUSCH,b,f,c}$, a pathloss reference signal, a fractional pathloss compensation factor $\alpha_{b,f,c}$, and a closed-loop transmit power control (TPC) command or PUSCH power control adjustment state $f_{b,f,c}$.

Figure 16:
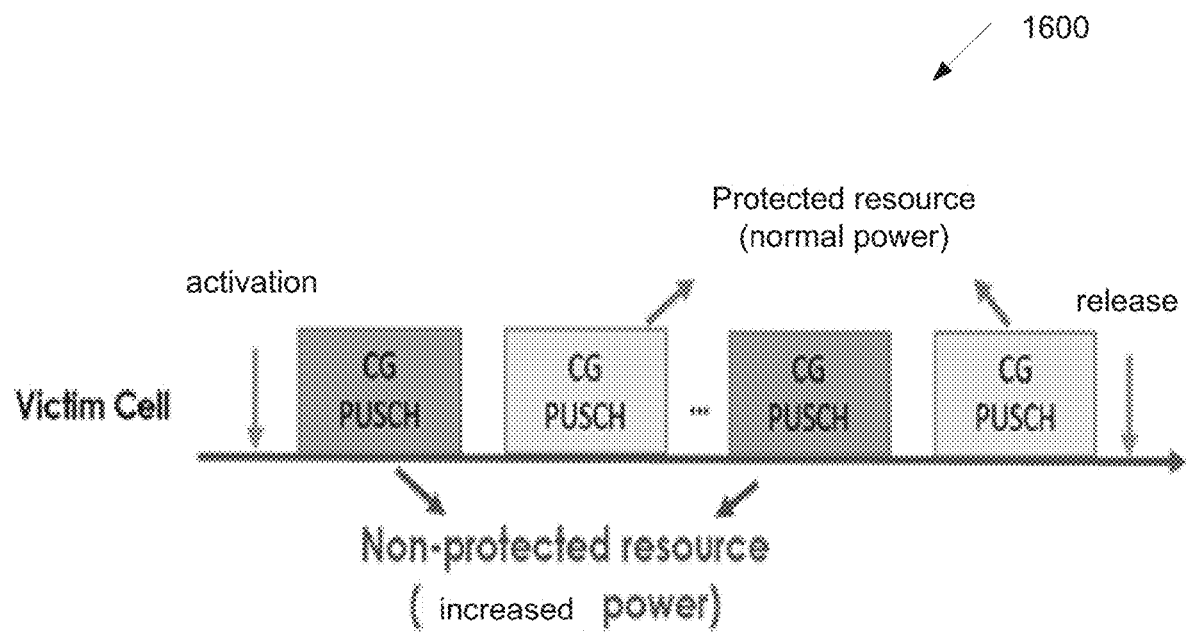
FIG. 16 illustrates an example setting in which a UE in a victim cell transmits a CG-PUSCH with varying transmission power levels according to embodiments of the present disclosure.

FIG. 16 illustrates an example setting 1600 in which a UE in a victim cell transmits a CG-PUSCH with varying transmission power levels according to embodiments of the present disclosure. An embodiment of the setting 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

In one example, for a UE operating in a second/victim UE cell, as illustrated in FIG. 16, the UE can be configured to transmit CG-PUSCH with a first $P_{O\_PUSCH,b,f,c}$ value during reduced activity slots/protected resources, and with a second $P_{O\_PUSCH,b,f,c}$ value outside reduced activity slots/protected resources, wherein for example the second value is larger than the first value, so that increased inter-cell interference that is expected in non-protected slots/resources can be compensated. Similar, the UE can be configured with a first $\alpha_{b,f,c}$ value during reduced activity slots/protected resources and a second $\alpha_{b,f,c}$ value outside reduced activity slots/protected resources, wherein for example the second value is larger than the first value.

In another example, for a UE operating in a first/aggressor cell, the UE can be configured to transmit CG-PUSCH with a first $P_{O\_PUSCH,b,f,c}$ value outside reduced activity slots/protected resources, and with a second $P_{O\_PUSCH,b,f,c}$ value during reduced activity slots/protected resources, wherein for example the second value is larger than the first value, so that less inter-cell interference is caused in those slots/resources. Similar, the UE can be configured with a first value of $\alpha_{b,f,c}$ outside reduced activity slots/protected resources and with a second value of $\alpha_{b,f,c}$ during reduced activity slots/protected resources, wherein for example the second value is larger than the first value.

In one example, a TPC command provided by a DCI format such as a DCI format 2_2 with CRC scrambled by a TPC-PUSCH-RNTI can include an indication whether the TPC command applies to the first set of slots or the second set of slots or the DCI format can include two TPC commands, wherein the first applies to the first sets of slots and the second applies to the second set of slots. Alternatively, a same TCP command can apply to all sets of slots when the TPC command intends to compensate for SINR variations due to channel fading and not due to interference.

In one example, a time pattern or a set of slots can be periodic with a configurable periodicity and/or slot offset. In another example, a time pattern or a set of slots can be irregular or arbitrary, wherein a bitmap with a predetermined/configurable length is used to indicate which slots/resources are included or excluded in the pattern.

In one embodiment of E-3-2, a configuration of a time pattern for L1-RSRP/L1-SINR measurements used for beam management and/or link recovery procedure is provided according to a configuration for reduced activity slots/protected resources.

In one embodiment, a UE can be configured a time pattern, such as a set of slots/occasions, for measurement of SSB and/or CSI-RS resource, such as L1/L3 RSRP or SINR measurement or variants thereof, aimed for beam management and/or link recovery procedures (also known as, beam failure recovery), e.g., including for radio link quality measurements (such as for beam failure detection and/or new candidate beam identification) on the BWP of the serving cell. According to this embodiment, the UE is not expected to consider measurements of the SSB and/or CSI-RS resource (e.g., not allowed to average the measurements) when reporting L1/L3 RSRP or SINR measurements.

A motivation for such time pattern restriction for beam management and/or link recovery procedure is to distinguish the case that a "bad" beam quality is due to spatial reasons such as non-aligned beam pair/spatially blocked beam pairs of UE and gNB, from the case that the "bad" beam quality is due to temporal reasons such as inappropriate timing of the measurement, e.g., because a measurement is made in a time slot/resource that is not part of reduced activity slots/protected resource, and is thus experiencing a significant interference level. Therefore, SSB and/or CSI-RS measurements in reduced activity slots/protected resources may not be mixed (e.g., averaged out) with measurements outside reduced activity slots/protected resources.

In one example, an in-sync (IS) and/or an out-of-sync (OOS) counter is expected to count incidents when an RSRP/SINR measurement corresponds to a reduced activity slot/protected resource. In another example, a time for link recovery procedure is expected to include only reduced activity slots/protected resources when determining a link failure event.

In one example, a time pattern or a set of slots can be periodic with a configurable periodicity and/or slot offset. In another example, a time pattern or a set of slots can be irregular or arbitrary, wherein a bitmap with a predetermined/configurable length is used to indicate which slots/resources are included or excluded in the pattern.

In one embodiment of E-4, transmission timing constraints are provided according to a configuration for reduced activity slots/protected resources.

Figure 17:
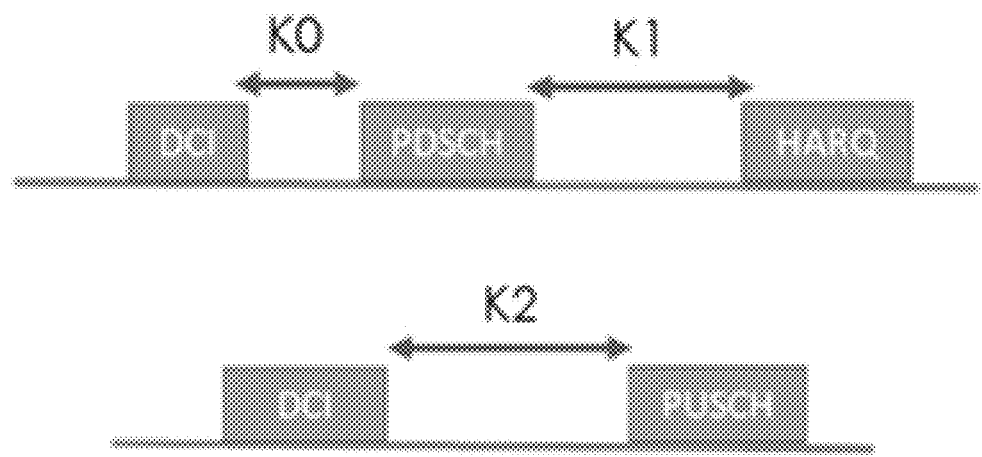
FIG. 17 illustrates an example operation of transmission timing constraints according to embodiments of the present disclosure.

FIG. 17 illustrates an example operation of transmission timing constraints 1700 according to embodiments of the present disclosure. An embodiment of the operation of transmission timing constraints 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

In one embodiment, a UE can be configured with a pattern for transmission timing constraints such as K0, K1, and K2 (as shown in FIG. 17) based on a configuration of reduced activity slots or more generally protected resources, so that UE transmission and/or reception timing, such as reception timing of a PDSCH scheduled by a DCI format or a PUCCH transmission timing for HARQ-ACK information or a transmission timing of a PUSCH scheduled by a DCI format, and so on, overlap with reduced activity slots/protected resources.

For example, the transmission timing constraints may be K0, K1, and K2 to represent reception timing of a dynamically scheduled PDSCH and transmission timing of a HARQ-ACK information feedback as well as transmission timing of a dynamically scheduled PUSCH, respectively.

Figure 18:
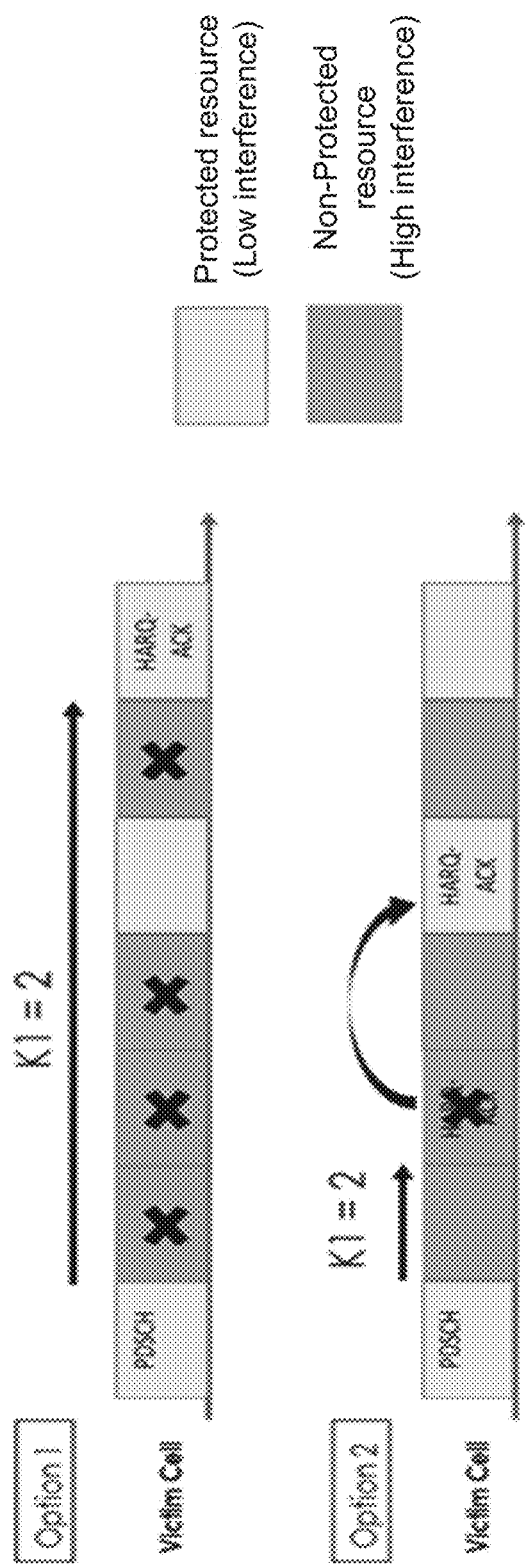
FIG. 18 illustrates an example operation of HARQ-ACK transmission timing constraint according to embodiments of the present disclosure.

FIG. 18 illustrates an example operation of HARQ-ACK transmission timing constraint 1800 in the presence of time patterns configuring reduced activity slots or more generally protected resources according to embodiments of the present disclosure. An embodiment of the operation of HARQ-ACK transmission timing constraint 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

As shown in FIG. 18, in one example, a UE can be configured with a time pattern, such as a set of slots, for transmissions/receptions. According to the example, in one version (denoted by Option 1), the UE is expected to count K0, K1, and K2 values only over the configured time pattern/set of slots to determine a transmission/reception timing, while in another version (denoted by Option 2), the UE counts the K0, K1, and K2 values over all slots to determine the transmission/reception timing. If the determined timing falls outside the configured time pattern/set of slots, the UE is expected to transmit/receive in the first/earliest next slot/symbol/resource that is included in the configured time pattern/set of slots. In one example, the indicated K0, K1, K2 parameters and/or the pattern for transmission/reception timing constraints can be based on group of symbols, such as sub-slots with predetermined or configured duration, that are used across the time domain, as sub-units of time for K0/K1/K2 counting purposes.

In one example, if the UE is additionally configured TDD UL/DL configuration(s), then determination of transmission timing by the UE considers the TDD UL/DL configuration (s) and the configured time pattern/set of slots for reduced activity slots or protected resources. For example, a DL reception can only occur in a slot/sub-slot with sufficient number of DL symbols (and/or flexible symbols) or simply in DL-only slots, and only in slots/time units configured as part of the time pattern for reduced activity slots or protected resources. In another example, an UL transmission can only occur in a slot/sub-slot with sufficient number of UL symbols (and/or flexible symbols) or simply in UL-only slots, and only in slots/time units configured as part of the time pattern for reduced activity slots or protected resources.

A scenario wherein such method can be beneficial is when the existing bit-width for indication of K0/K1/K2 in a scheduling DCI format and/or in a configuration is not sufficient for indication of the actual value of the transmission timing constraint because e.g., the UE needs to skip several symbols/sub-slots/slots due to configured time pattern/set of slots for reduced activity slots or protected resources and possibly also due to the TDD DL/UL pattern configuration.

In one example, a configured time pattern/set of slots for transmission/reception timing constraints can apply to configured transmission/receptions (by higher layers, e.g., by RRC) and/or to dynamically scheduled transmission/receptions (e.g., by MAC/physical (PHY) layers, e.g., via DCI or MAC-CE).

In one example, a time pattern or a set of slots for transmission/reception timing constraints can be periodic with a configurable periodicity and/or slot offset. In another example, a time pattern or a set of slots can be irregular or arbitrary, wherein a bitmap with a predetermined/configurable length is used to indicate which slots/resources are included or excluded in the pattern.

It is noted that, different (time) patterns such as different sets of slots that are used for different purposes related to inter-cell interference protection and coordination can be same or different. For example, time patterns such as sets of slots configured for, e.g., CSI-RS transmission power levels and/or CSI calculation, e.g., for link adaptation and/or for beam management and/or beam failure recovery and/or for CG-PUSCH power control and/or for transmission/reception slot indication such as for transmission time constraints can be same or different. In one example, some/all such time patterns also implicitly or explicitly consider a TDD UL/DL configuration so that UE transmissions fall into UL slots/symbols and UE receptions fall into DL slots/symbols.

It is noted that, a configuration of time/slot/resource patterns configured to UEs (such as those for CSI-RS transmission power levels and/or CSI calculation, e.g., for link adaptation and/or for beam management and/or beam failure recovery and/or for CG-PUSCH power control and/or for transmission/reception slot indication such as for transmission time constraints) are up to serving gNB implementation and may or may not be identical to similar patterns indicated/exchanged (e.g., over the Xn interface) between the gNB and another (neighboring) gNB, e.g., for interference protection and/or coordination purposes. However, it is possible that there may be a relationship between the two sets of patterns, e.g., a pattern configured to UE(s) can be a subset of a pattern (or subset of complement of a pattern) indicated/exchanged between the two gNBs.

The present disclosure can be applicable to NR specifications Rel-17/18 to provide enhancements for inter-cell interference protection.

The present disclosure enables an improved operation of 3GPP 5G NR system in lower frequency band, wherein a boundary of serving cell is large, and therefore, many UEs can be impacted by inter-cell interference. This can include at least scenarios for macro-cell to macro-cell interference, macro-cell to small-cell interference, and CAG/CSG to macro-/small-cell interference. The embodiments, however, are generic and can apply to other frequency bands including various frequency bands in different FRs such as FR1, FR2, and FR4 or FR2-2, e.g., mid frequency bands, such as 1-7 GHz, and high/millimetre frequency bands, such as 24-100 GHz. In addition, the embodiments are generic and can apply to various use cases and settings as well, such as eMBB, URLLC and IIoT, mMTC and IoT, sidelink/V2X, operation in NR-U, NTN, operation with RedCap UEs, private or NPN, and so on.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a first base station, the method comprising:
   determining first information corresponding to a first synchronization signal/physical broadcast channel (SS/PBCH) block for a first serving cell, wherein the first information includes:
      a first interference level from a set of interference levels,
      a first priority level from a set of priority levels, and
      a first resource from a set of resources,
   determining second information corresponding to a second SS/PBCH block for the first serving cell, wherein:
      the second SS/PBCH block is in different frequency resources of the first serving cell than the first SS/PBCH block, and
      the second information includes:
         a second interference level from the set of interference levels,
         a second priority level from the set of priority levels, and
         a second resource from the set of resources, and
   transmitting, to a second base station, the first information and the second information,
   wherein the first interference level and the first priority level are associated with the first resource; and
   wherein the second interference level and the second priority level are associated with the second resource.

2. The method of claim 1, further comprising:
   transmitting third information for a set of ranges including at least one of:

a set of interference power ranges,
a set of signal-to-noise and interference ratio (SINR) ranges,
a set of reference signal received power (RSRP) ranges, and
a set of transmission duration ranges,
wherein the first interference level associated with the first resource is further associated with a range from the set of ranges provided by the third information.

3. The method of claim 1, wherein the first SS/PBCH block is a cell-defining SS/PBCH block and the second SS/PBCH block is a non-cell-defining SS/PBCH block.

4. The method of claim 1, wherein a unit for the first resource from the set of resources is at least one of:
an absolute time unit, a number of symbols, or a slot for a reference subcarrier spacing (SCS),
an absolute frequency unit, a number of resource block (RBs), or a bandwidth part (BWP) for a reference SCS, and
an absolute spatial unit, a synchronization signal/primary broadcast channel (SS/PBCH) block index, or an SS/PBCH area.

5. The method of claim 1, further comprising:
receiving, from the second base station, third information for a set of time, frequency, or spatial resources that is associated with each of at least two synchronization signal/physical broadcast channel (SS/PBCH) blocks transmitted by the second base station on a second serving cell.

6. The method of claim 1, further comprising:
receiving, from the second base station, third information for time, frequency, or spatial resources used for transmission by the second base station of system information (SI) or paging on a second serving cell, wherein the third information includes at least one of:
a periodicity and slot offset for the transmission of SI or paging, and
frequency resources of a control resource set with index zero (CORESET #0) associated with scheduling the transmission of SI or paging.

7. The method of claim 1, further comprising:
transmitting third information for a set of disjoint time, frequency, or spatial resource patterns; and
transmitting a set of properties for a signal or channel transmission or reception using time, frequency, or spatial resources from a pattern from the set of patterns, wherein the set of properties includes at least one of:
a set of transmission power control parameters,
a modulation and coding scheme (MCS) table,
a time domain resource allocation (TDRA) table,
a maximum number of repetitions, and
a set of slot timing values for transmission of acknowledgement information after a slot of an associated reception.

8. A first base station comprising:
a processor configured to:
determine first information corresponding to a first synchronization signal/physical broadcast channel (SS/PBCH) block for a first serving cell, wherein the first information includes:
a first interference level from a set of interference levels,
a first priority level from a set of priority levels, and
a first resource from a set of resources,
determine second information corresponding to a second SS/PBCH block for the first serving cell, wherein:

the second SS/PBCH block is in different frequency resources of the first serving cell than the first SS/PBCH block, and
the second information includes:
a second interference level from the set of interference levels,
a second priority level from the set of priority levels, and
a second resource from the set of resources; and
a transceiver, operably coupled to the processor, the transceiver configured to transmit, to a second base station, the first information and the second information,
wherein the first interference level and the first priority level are associated with the first resource, and
wherein the second interference level and the second priority level are associated with the second resource.

9. The first base station of claim 8, wherein:
the transceiver is further configured to transmit third information for a set of ranges including at least one of:
a set of interference power ranges,
a set of signal-to-noise and interference ratio (SINR) ranges,
a set of reference signal received power (RSRP) ranges, and
a set of transmission duration ranges, and
the first interference level associated with the first resource is further associated with a range from the set of ranges provided by the third information.

10. The first base station of claim 8, wherein the first SS/PBCH block is a cell-defining SS/PBCH block and the second SS/PBCH block is a non-cell-defining SS/PBCH block.

11. The first base station of claim 8, wherein a unit for the first resource from the set of resources is at least one of:
an absolute time unit, a number of symbols, or a slot for a reference subcarrier spacing (SCS),
an absolute frequency unit, a number of resource block (RBs), or a bandwidth part (BWP) for a reference SCS, and
an absolute spatial unit, a synchronization signal/primary broadcast channel (SS/PBCH) block index, or an SS/PBCH area.

12. The first base station of claim 8, wherein the transceiver is further configured to receive, from the base station, third information for a set of time, frequency, or spatial resources that is associated with each of at least two synchronization signal/physical broadcast channel (SS/PBCH) blocks transmitted by the second base station on a second serving cell.

13. The first base station of claim 8, wherein:
the transceiver is further configured to receive, from the second base station, third information for time, frequency, or spatial resources used for transmission by the second base station of system information (SI) or paging on a second serving cell, and
the third information includes at least one of:
a periodicity and slot offset for the transmission of SI or paging, and
frequency resources of a control resource set with index zero (CORESET #0) associated with scheduling the transmission of SI or paging.

14. The first base station of claim 8, wherein:
the transceiver is further configured to transmit:
third information for a set of disjoint time, frequency, or spatial resource patterns, and a set of properties for a signal or channel transmission or reception using time, frequency, or spatial resources from a pattern from the set of patterns, and the set of properties is at least one of:
- a set of transmission power control parameters,
- a modulation and coding scheme (MCS) table,
- a time domain resource allocation (TDRA) table,
- a maximum number of repetitions, and
- a set of slot timing values for transmission of acknowledgement information after a slot of an associated reception.

15. A second base station comprising:

a transceiver configured to:
- receive, from a first base station, first information corresponding to a first synchronization signal/physical broadcast channel (SS/PBCH) block for a first serving cell, wherein the first information includes:
  - a first interference level from a set of interference levels,
  - a first priority level from a set of priority levels, and
  - a first resource from a set of resources; and
- receive, from the first base station, second information corresponding to a second SS/PBCH block for the first serving cell, wherein:
  - the second SS/PBCH block is in different frequency resources of the first serving cell than the first SS/PBCH block, and
  - the second information includes:
    - a second interference level from the set of interference levels,
    - a second priority level from the set of priority levels, and
    - a second resource from the set of resources, wherein the first interference level and the first priority level are associated with the first resource; and wherein the second interference level and the second priority level are associated with the second resource.

16. The second base station of claim 15, wherein:

the transceiver is further configured to receive third information for a set of ranges including at least one of:
- a set of interference power ranges,
- a set of signal-to-noise and interference ratio (SINR) ranges,
- a set of reference signal received power (RSRP) ranges, and
- a set of transmission duration ranges, and the first interference level associated with the first resource is further associated with a range from the set of ranges provided by the third information.

17. The second base station of claim 15, wherein the first SS/PBCH block is a cell-defining SS/PBCH block and the second SS/PBCH block is a non-cell-defining SS/PBCH block.

18. The second base station of claim 15, wherein a unit for the first resource from the set of resources is at least one of:
- an absolute time unit, a number of symbols, or a slot for a reference subcarrier spacing (SCS),
- an absolute frequency unit, a number of resource block (RBs), or a bandwidth part (BWP) for a reference SCS, and
- an absolute spatial unit, a synchronization signal/primary broadcast channel (SS/PBCH) block index, or an SS/PBCH area.

19. The second base station of claim 15, wherein the transceiver is further configured to transmit, to the first base station, third information for a set of time, frequency, or spatial resources that is associated with each of at least two synchronization signal/physical broadcast channel (SS/PBCH) blocks transmitted by the second base station on a second serving cell.

20. The second base station of claim 15, wherein:

the transceiver is further configured to transmit, to the first base station, third information for time, frequency, or spatial resources used for transmission by the second base station of system information (SI) or paging on a second serving cell, and the third information includes at least one of:
- a periodicity and slot offset for the transmission of SI or paging, and
- frequency resources of a control resource set with index zero (CORESET #0) associated with scheduling the transmission of SI or paging.

* * * * *